US012739305B2

(12) United States Patent
Rodrigo et al.

(10) Patent No.: US 12,739,305 B2
(45) Date of Patent: Sep. 15, 2026

(54) SERVICE EXECUTION HANDLING

(71) Applicant: Telefonaktiebolaget LM Ericsson (publ), Stockholm (SE)

(72) Inventors: Maria Cruz Bartolome Rodrigo, Madrid (ES); Aldo Bolle, Västra Frölunda (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 26 days.

(21) Appl. No.: 18/550,543

(22) PCT Filed: Apr. 13, 2022

(86) PCT No.: PCT/EP2022/059925
§ 371 (c)(1),
(2) Date: Sep. 14, 2023

(87) PCT Pub. No.: WO2022/219069
PCT Pub. Date: Oct. 20, 2022

(65) Prior Publication Data
US 2024/0179210 A1 May 30, 2024

(30) Foreign Application Priority Data
Apr. 14, 2021 (EP) .................................... 21382316
Apr. 14, 2021 (EP) .................................... 21382317

(51) Int. Cl.
*H04L 67/51* (2022.01)
*H04L 67/1008* (2022.01)
(Continued)

(52) U.S. Cl.
CPC .......... *H04L 67/51* (2022.05); *H04L 67/1008* (2013.01); *H04L 67/1012* (2013.01);
(Continued)

(58) Field of Classification Search
CPC ................ H04L 67/51; H04L 67/1008; H04L 67/1012; H04W 28/0992; H04W 28/084; H04W 4/20; H04W 28/08
See application file for complete search history.

(56) References Cited

U.S. PATENT DOCUMENTS 10,778,527 B2 * 9/2020 Assali ................ H04L 41/0894
10,791,044 B1 * 9/2020 Krishan ................ H04L 43/50
(Continued)

FOREIGN PATENT DOCUMENTS

CN 113508611 A 10/2021
JP 2022103356 A 7/2022
(Continued)

OTHER PUBLICATIONS

"3GPP TS 29.303 V17.0.0", 3rd Generation Partnership Project; Technical Specification Group Core Network and Terminals; Domain Name System Procedures; Stage 3; (Release 17), Dec. 2020, pp. 1-81.
(Continued)

*Primary Examiner* — Abdelbasst Talioua
(74) *Attorney, Agent, or Firm* — Murphy, Bilak & Homiller, PLLC

(57) ABSTRACT

There is provided a method for handling execution of a service in a network. The method is performed by a first network node. The first network node is a first network function (NF) node of a service consumer or a first service communication proxy (SCP) node that is configured to operate as an SCP between the first NF node and second NF nodes of a service producer for providing the service. The method is performed in response to an event that signals that the service is to be executed. The method comprises, if a first configuration criterion of the first NF node and/or a second configuration criterion of at least one of the second NF nodes is met, identifying (102) that network traffic for executing
(Continued)

the service is to be distributed among the second NF nodes according to a capacity of one or more of the second NF nodes.

20 Claims, 6 Drawing Sheets

(51) Int. Cl.
*H04L 67/1012* (2022.01)
*H04W 4/20* (2018.01)
*H04W 28/08* (2023.01)
*H04W 28/084* (2023.01)

(52) U.S. Cl.
CPC ............ *H04W 4/20* (2013.01); *H04W 28/08* (2013.01); *H04W 28/084* (2023.05); *H04W 28/0992* (2020.05)

(56) References Cited

U.S. PATENT DOCUMENTS 10,833,938 B1 * 11/2020 Rajput .................. H04L 41/082
11,301,362 B1 * 4/2022 John ..................... G06F 11/302
11,570,262 B2 * 1/2023 Sapra ...................... H04L 41/08
2014/0160927 A1 * 6/2014 Majumdar ............. H04L 47/10 370/235
2015/0163131 A1 * 6/2015 Bauer ..................... H04L 45/44 709/223
2016/0323145 A1 * 11/2016 Anderson ........... H04L 67/1097
2019/0230012 A1 7/2019 Azizullah et al.
2020/0127916 A1 * 4/2020 Krishan .................. H04L 45/02
2020/0136960 A1 * 4/2020 Jeuk .................... H04L 12/4633
2020/0177457 A1 * 6/2020 Seenappa ............ H04L 41/0873
2020/0310950 A1 * 10/2020 Mueller .............. G06F 11/3006
2020/0313996 A1 * 10/2020 Krishan .............. H04L 41/5096
2020/0367045 A1 11/2020 Jeong et al.
2021/0067485 A1 3/2021 Goel
2021/0112443 A1 4/2021 Krishan et al.
2021/0120452 A1 * 4/2021 Kotecha ................ H04W 40/22
2021/0297896 A1 * 9/2021 Landais .................. H04L 47/33
2022/0104112 A1 3/2022 Rajput et al.
2022/0109972 A1 4/2022 Jeong et al.
2022/0124468 A1 4/2022 Lu et al.
2022/0131945 A1 * 4/2022 Sapra ...................... H04L 41/08
2022/0132358 A1 * 4/2022 Peng ................. H04W 28/0268
2022/0247779 A1 * 8/2022 Rajput ................ H04L 63/1458
2022/0294775 A1 * 9/2022 Singh .................. H04L 63/0815
2022/0330057 A1 * 10/2022 Bratu ................. H04B 17/0085

FOREIGN PATENT DOCUMENTS

WO 2020202043 A1 10/2020
WO WO-2021251948 A1 * 12/2021 ......... H04L 41/0896

OTHER PUBLICATIONS

"CR Pack on Load and Overload Control of 5GC Service Based Interfaces", 3GPP TSG-CT Meeting #87, CP-200025, Online, Mar. 16-18, 2020, 1 page.
"Default Notifications", 3GPP TSG-CT WG4 Meeting #101e, E-Meeting, C4-205785, (was C4-205543), Nov. 3-13, 2020, pp. 1-26.
"Dynamic Load Control", 3GPP TSG-CT WG4 Meeting #96e, E-Meeting, C4-201219, Revision of 016(316), 101, 401, 925, 1190, Feb. 17-28, 2020, pp. 1-8.
"3GPP TS 29.510 V16.5.0", 3rd Generation Partnership Project; Technical Specification Group Core Network and Terminals; 5G System; Network Function Repository Services; Stage 3 (Release 16), Sep. 2020, pp. 1-195.
"3GPP TS 29.500 V17.1.0", 3rd Generation Partnership Project; Technical Specification Group Core Network and Terminals; 5G System; Technical Realization of Service Based Architecture; Stage 3 (Release 17), Dec. 2020, pp. 1-90.
"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.
"3rd Generation Partnership Project; Technical Specification Group Core Network and Terminals; 5G System; Network Function Repository Services; Stage 3 (Release 17)", 3GPP TS 29.510 V17.4.0, Dec. 2021, pp. 1-284.
"3rd Generation Partnership Project; Technical Specification Group Services and System Aspects; Procedures for the 5G System (5GS); Stage 2 (Release 17)", 3GPP TS 23.502 V17.3.0, Dec. 2021, pp. 1-727.
"3rd Generation Partnership Project; Technical Specification Group Services and System Aspects; System architecture for the 5G System (5GS); Stage 2 (Release 17)", 3GPP TS 23.501 V17.3.0, Dec. 2021, pp. 1-559.

* cited by examiner

If a first configuration criterion of the first NF node and/or a second configuration criterion of at least one second NF node is met, identify that network traffic for executing the service is to be distributed among the second NF nodes according to a capacity of one or more second NF nodes

102

SERVICE EXECUTION HANDLING

TECHNICAL FIELD

The disclosure relates to a method for handling execution of a service in a network and a node configured to operate in accordance with that method.

BACKGROUND

There exist various techniques for handling a request for a service in a network. A service request is generally from a consumer of the service ("service consumer") to a producer of the service ("service producer"). For example, a service request may be from a network function (NF) node of a service consumer to an NF node of a service producer. The NF node of the service consumer and the NF node of the service producer can communicate directly or indirectly. This is referred to as direct communication and indirect communication respectively. In the case of indirect communication, the NF node of the service consumer and the NF node of the service producer may communicate via a service communication proxy (SCP) node.

FIG. 1A-D illustrates different existing systems for handling service requests, as set out in 3GPP TS 23.501 v16.4.0. In more detail, FIGS. 1A and 1B illustrate systems that use direct communication, while FIGS. 1C and 1D illustrate systems that use indirect communication.

In the systems illustrated in FIGS. 1A and 1B, a service request is sent directly from the NF node of the service consumer to the NF node of the service producer. A response to the service request is sent directly from the NF node of the service producer to the NF node of the service consumer. Similarly, any subsequent service requests are sent directly from the NF node of the service consumer to the NF node of the service producer. The system illustrated in FIG. 1B also comprises a network repository function (NRF) node. Thus, in the system illustrated in FIG. 1B, the NF node of the service consumer can query the NRF node to discover suitable NF nodes of the service producer to which to send the service request. In response to such a query, the NF node of the service consumer can receive an NF profile for one or more NF nodes of the service producer and, based on the received NF profile(s) can select an NF node of the service producer to which to send the service request. In the system illustrated in FIG. 1A, the NRF node is not used and instead the NF node of the service consumer may be configured with the NF profile(s) of the NF node(s) of the service producer.

In the systems illustrated in FIGS. 1C and 1D, a service request is sent indirectly from the NF node of the service consumer to the NF node of the service producer via a service communication proxy (SCP) node. A response to the service request is sent indirectly from the NF node of the service producer to the NF node of the service consumer via the SCP. Similarly, any subsequent service requests are sent indirectly from the NF node of the service consumer to the NF node of the service producer via the SCP. The systems illustrated in FIGS. 1C and D also comprise an NRF node.

In the system illustrated in FIG. 1C, the NF node of the service consumer can query the NRF node to discover suitable NF nodes of the service producer to which to send the service request. In response to such a query, the NF node of the service consumer can receive an NF profile for one or more NF nodes of the service producer and, based on the received NF profile(s) can select an NF node of the service producer to which to send the service request. In this case, the service request sent from the NF node of the service consumer to the SCP comprises the address of the selected NF node of the service producer. The NF node of the service consumer can forward the service request without performing any further discovery or selection. In case the selected NF node of the service producer is not accessible for any reason, it may be up to the NF node of the service consumer to find an alternative. In other cases, the SCP may communicate with the NRF node to acquire selection parameters (e.g. location, capacity, etc.) and the SCP may select an NF node of the service producer to which to send the service request.

In the system illustrated in FIG. 1D, the NF node of the service consumer does not carry out the discovery or selection process. Instead, the NF node of the service consumer adds any necessary discovery and selection parameters (required to find a suitable NF node of the service producer) to the service request that it sends via the SCP. The SCP uses the request address and the discovery and selection parameters in the service request to route the service request to a suitable NF node of the service producer. The SCP can perform discovery with the NRF node.

For the fifth generation core (5GC), from Release 16, the SCP is included as a network element to allow indirect communication between an NF node of a service consumer and an NF node of a service producer. The indirect communication that is used can be either of the two indirect communications options described earlier with reference to FIGS. 1C and 1D.

According to the above-described systems, the NF node of the service consumer or the SCP node needs to initially select (or reselect, e.g. in case of a failure) an NF node of a service producer, such as among a plurality of functionally equivalent instances of the NF node of the service producer. Generally, this selection (or reselection) is based on one or more characteristics (or properties) of the NF nodes of the service producer, such as those defined in the profiles of the NF nodes of the service producer. Examples of the characteristics include a priority assigned to the NF nodes of the service producer, a locality of the NF nodes of the service producer, a capacity of the NF nodes of the service producer, and a load on the NF nodes of the service producer. In some situations, the selection (or reselection) may take into account other information from an NF node of the service producer, such as load information received in responses from the NF node of the service producer, and/or any configured policies, such as which locality is to take precedence over another.

3GPP TS 29.500 v17.1.0 defines two load control mechanisms. The first load control mechanism relies on the NF node of the service producer updating the load information in its profile that is stored at the NRF node, and then the NF node of the service consumer or the SCP node can discover this NF profile that comprises the load information. The second load control mechanism relies on the NF node of the service producer signalling the load information to the NF node of the service consumer or the SCP node. Generally, the load information in both mechanisms includes a value from 0 (minimum) to 100 (maximum), which provides an indication of the resource usage at the NF node of the service producer. For example, if the load information for an NF node of a service producer comprises a value of 100, the NF node of the service consumer or the SCP node interprets this as indicating that no new requests are to be transmitted towards the NF node of a service producer. On the other hand, if the load information for an NF node of a service producer comprises a value of 0, the NF node of the service consumer or the SCP node interprets this as indicating that the NF node of the service producer is not processing any network traffic (i.e. there is no load on the NF node of the service producer). Then, based on the load information, the NF node of the service consumer or the SCP node is able to select the less loaded target.

SUMMARY

There are some situations in which a customer may request that new resources are included in the network and this may require an NF node of a service producer to process only a certain amount of network traffic. For example, this may be the case when initially testing new upgrades and/or features on a single NF node of a service producer in the network, before the upgrades or features are considered for all NF nodes of the service producer in the network. However, this currently requires specific implementation and/or configuration in the NF node of the service consumer or the SCP node and there is currently no mechanism defined in the art to support this. Moreover, an added difficulty arises when selecting an NF node of a service producer based on load information according to the existing techniques, since there may be cases where one or more NF nodes of the service producer do not report load information (e.g. as they may not support such a feature). Currently, there is no mechanism to enable the NF node of the service consumer or the SCP node to handle such a situation.

It is an object of the disclosure to obviate or eliminate at least some of the above-described disadvantages associated with existing techniques.

Therefore, according to an aspect of the disclosure, there is provided a method for handling execution of a service in a network. The method is performed by a first network node. The first network node is a first network function (NF) node of a service consumer or a first service communication proxy (SCP) node that is configured to operate as an SCP between the first NF node and second NF nodes of a service producer for providing a service. The method is performed in response to an event that signals that the service is to be executed. The method comprises, if a first configuration criterion of the first NF node and/or a second configuration criterion of at least one of the second NF nodes is met, identifying that network traffic for executing the service is to be distributed among the second NF nodes according to a capacity of one or more of the second NF nodes.

According to another aspect of the disclosure, there is also provided a first network node comprising processing circuitry configured to operate in accordance with this method described in respect of the first network node. In some embodiments, the first network node may comprise at least one memory for storing instructions which, when executed by the processing circuitry, cause the first network node to operate in accordance with this method described in respect of the first network node.

According to another aspect of the disclosure, there is provided a computer program comprising instructions which, when executed by processing circuitry, cause the processing circuitry to perform the method described in respect of the first network node.

According to another aspect of the disclosure, there is provided a computer program product, embodied on a non-transitory machine-readable medium, comprising instructions which are executable by processing circuitry to cause the processing circuitry to perform the method described in respect of the first network node.

Therefore, an improved technique for handling execution of a service in a network is provided.

BRIEF DESCRIPTION OF THE DRAWINGS

For a better understanding of the technique, and to show how it may be put into effect, reference will now be made, by way of example, to the accompanying drawings, in which.

DETAILED DESCRIPTION

Some of the embodiments contemplated herein will now be described more fully with reference to the accompanying drawings. Other embodiments, however, are contained within the scope of the subject-matter disclosed herein, the disclosed subject-matter should not be construed as limited to only the embodiments set forth herein; rather, these embodiments are provided by way of example to convey the scope of the subject-matter to those skilled in the art.

As mentioned earlier, there is described herein an advantageous technique for handling execution of a service in a network. Generally, a service is software intended to be managed for a user. Herein, a service can be any type of service, such as a communication service (e.g. a notification service or a callback service), a context management (e.g. user equipment context management (UECM)) service, a data management (DM) service, or any other type of service. Herein, references to providing a service can refer to, for example, executing or running the service.

The techniques described herein can be used in respect of any network, such as any communications or telecommunications network, e.g. cellular network. The network may be a fifth generation (5G) network or any other generation network. In some embodiments, the network may be a core network or a radio access network (RAN). The techniques described herein are implemented by a first network node. The first network node is a first network function (NF) node of a service consumer or a first service communication proxy (SCP) node that is configured to operate as an SCP between the first NF node and second NF nodes of a service producer for providing a service.

An NF is a third generation partnership project (3GPP) adopted, or 3GPP defined, processing function in a network, which has defined functional behaviour and 3GPP defined interfaces. An NF can be implemented either as a network element on a dedicated hardware, as a software instance running on a dedicated hardware, or as a virtualised function instantiated on an appropriate platform, e.g. on a cloud infrastructure. Herein, the term "node" in relation to an "NF node" will be understood to cover each of these scenarios. Herein, references to a plurality of NF nodes of a service producer may refer to, for example, functionally equivalent instances of NF nodes of the service producer.

Figure 1:
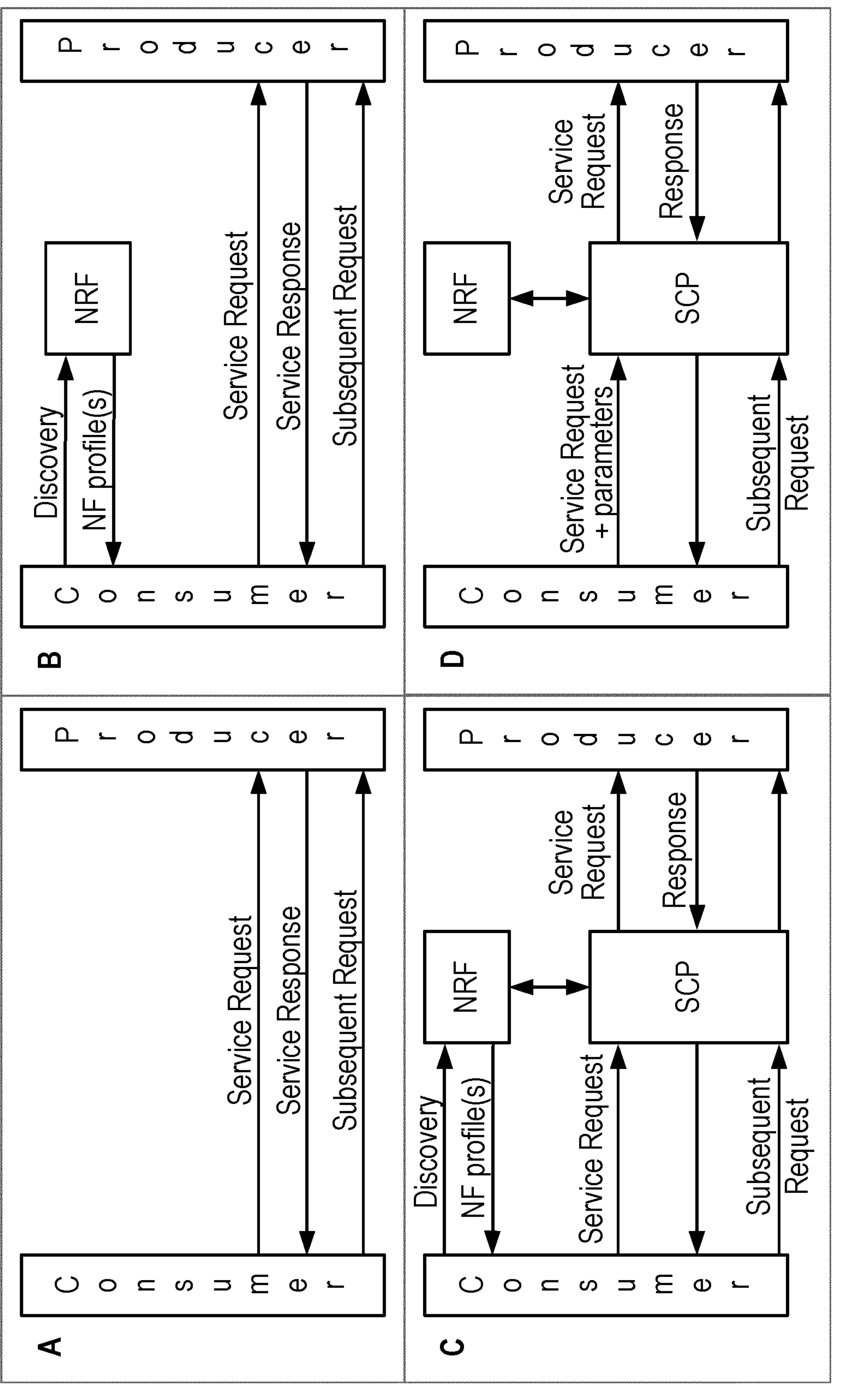
FIG. 1A-D is a block diagram illustrating different existing systems.
Figures 2, 3:
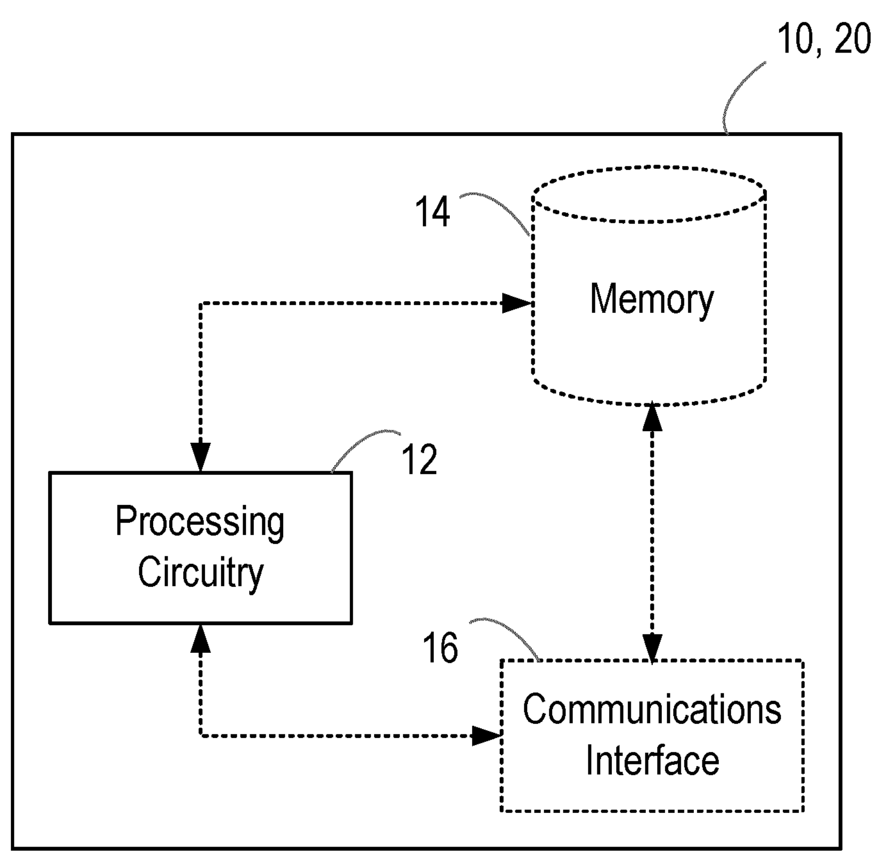
FIG. 2 is a block diagram illustrating a first network node according to an embodiment.
FIG. 3 is a block diagram illustrating a method performed by a first network node according to an embodiment.

FIG. 2 illustrates a first network node 10, 20 in accordance with an embodiment. The first network node 10, 20 is for handling execution of a service in a network. In some embodiments, the first network node 10, 20 can, for example, be a physical machine (e.g. a server) or a virtual machine (VM). The first network node 10, 20 can be a first NF node 20 of a service consumer or a first SCP node 10 that is configured to operate as an SCP between the first NF node 20 and second NF nodes of a service producer for providing a service.

As illustrated in FIG. 2, the first network node 10, 20 comprises processing circuitry (or logic) 12. The processing circuitry 12 controls the operation of the first network node 10, 20 and can implement the method described herein in respect of the first network node 10, 20. The processing circuitry 12 can be configured or programmed to control the first network node 10, 20 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first network node 10, 20. In some embodiments, the processing circuitry 12 can be configured to run software to perform the method described herein in respect of the first network node 10, 20. The software may be containerised according to some embodiments. Thus, in some embodiments, the processing circuitry 12 may be configured to run a container to perform the method described herein in respect of the first network node 10, 20.

Briefly, the processing circuitry 12 of the first network node 10, 20 is configured to operate in response to an event that signals that the service is to be executed. Specifically, the processing circuitry 12 of the first network node 10, 20 is configured to, if a first configuration criterion of the first NF node and/or a second configuration criterion of at least one of the second NF nodes is met, identify that network traffic for executing the service is to be distributed among the second NF nodes according to a capacity of one or more of the second NF nodes.

As illustrated in FIG. 2, in some embodiments, the first network node 10, 20 may optionally comprise a memory 14. The memory 14 of the first network node 10, 20 can comprise a volatile memory or a non-volatile memory. In some embodiments, the memory 14 of the first network node 10, 20 may comprise a non-transitory media. Examples of the memory 14 of the first network node 10, 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first network node 10, 20 can be communicatively coupled (e.g. connected) to the memory 14 of the first network node 10, 20. In some embodiments, the memory 14 of the first network node 10, 20 may be for storing program code or instructions which, when executed by the processing circuitry 12 of the first network node 10, 20, cause the first network node 10, 20 to operate in the manner described herein in respect of the first network node 10, 20. For example, in some embodiments, the memory 14 of the first network node 10, 20 may be configured to store program code or instructions that can be executed by the processing circuitry 12 of the first network node 10, 20 to cause the first network node 10, 20 to operate in accordance with the method described herein in respect of the first network node 10, 20. Alternatively or in addition, the memory 14 of the first network node 10, 20 can be configured to store any information, data, messages, requests, responses, indications, notifications, signals, or similar, that are described herein. The processing circuitry 12 of the first network node 10, 20 may be configured to control the memory 14 of the first network node 10, 20 to store information, data, messages, requests, responses, indications, notifications, signals, or similar, that are described herein.

In some embodiments, as illustrated in FIG. 2, the first network node 10, 20 may optionally comprise a communications interface 16. The communications interface 16 of the first network node 10, 20 can be communicatively coupled (e.g. connected) to the processing circuitry 12 of the first network node 10, 20 and/or the memory 14 of the first network node 10, 20. The communications interface 16 of the first network node 10, 20 may be operable to allow the processing circuitry 12 of the first network node 10, 20 to communicate with the memory 14 of the first network node 10, 20 and/or vice versa. Similarly, the communications interface 16 of the first network node 10, 20 may be operable to allow the processing circuitry 12 of the first network node 10, 20 to communicate with any other node mentioned herein. The communications interface 16 of the first network node 10, 20 can be configured to transmit and/or receive information, data, messages, requests, responses, indications, notifications, signals, or similar, that are described herein. In some embodiments, the processing circuitry 12 of the first network node 10, 20 may be configured to control the communications interface 16 of the first network node 10, 20 to transmit and/or receive information, data, messages, requests, responses, indications, notifications, signals, or similar, that are described herein.

Although the first network node 10, 20 is illustrated in FIG. 2 as comprising a single memory 14, it will be appreciated that the first network node 10, 20 may comprise at least one memory (i.e. a single memory or a plurality of memories) 14 that operates in the manner described herein. Similarly, although the first network node 10, 20 is illustrated in FIG. 2 as comprising a single communications interface 16, it will be appreciated that the first network node 10, 20 may comprise at least one communications interface (i.e. a single communications interface or a plurality of communications interface) 16 that operates in the manner described herein. It will also be appreciated that FIG. 2 only shows the components required to illustrate an embodiment of the first network node 10, 20 and, in practical implementations, the first network node 10, 20 may comprise additional or alternative components to those shown.

FIG. 3 illustrates a method performed by a first network node 10, 20 in accordance with an embodiment. The method is for handling execution of a service in a network. The first network node 10, 20 described earlier with reference to FIG. 2 can be configured to operate in accordance with the method of FIG. 3. In some embodiments, the method can be performed by or under the control of the processing circuitry 12 of the first network node 10, 20. The method is performed in response to an event that signals that the service is to be executed (e.g. provided).

As illustrated at block 102 of FIG. 3, if a first configuration criterion of the first NF node and/or a second configuration criterion of at least one of the second NF nodes is met, it is identified that network traffic for executing the service is to be distributed among the second NF nodes according to a capacity of one or more of the second NF nodes. In some embodiments, it may be that only the capacity of one or more of the second NF nodes is taken into account. In other embodiments, it may be that the capacity of one or more of the second NF nodes is taken into account as well as one or more other parameters, such as a load on the one or more of the second NF nodes (e.g. when load information is available) and/or any other available parameter(s). However, the capacity of one or more of the second NF nodes is always taken into account if the first configuration criterion of the first NF node and/or the second configuration criterion of at least one of the second NF nodes is met. In some embodiments, the network traffic may be distributed according to the capacity with a granularity of per service type and/or for a type of second NF node.

In some embodiments, the first configuration criterion of the first NF node 20 may be that the first NF node 20 is configured to distribute network traffic according to the capacity of the one or more of the second NF nodes irrespective of a load on each of the second NF nodes. For example, if the first NF node 20 is configured to distribute network traffic according to the capacity of the one or more of the second NF nodes and/or there is at least one second NF node (among those that the first NF node 20 may select for execution of the service) that is configured to require that it receives a predefined amount of network traffic (such as for testing, e.g. canary testing), the first NF node 20 may ignore any load information (e.g. with the exception of Load=100) that may potentially be indicated by one or more second NF nodes and take into account solely the capacity of one or more second NF nodes (e.g. defined in a profile of the one or more second NF nodes). In some embodiments, the first NF node 20 may be configured to distribute network traffic according to the capacity of the one or more of the second NF nodes irrespective of the load on each of the second NF nodes, unless the load on at least one of the second NF nodes is a maximum load that the at least one of the second NF nodes is capable of handling. For example, in some cases, a second NF node may already be fully loaded and unable to process any more network traffic. Thus, it may be that this second NF node is not included in the distribution of network traffic.

In other embodiments, the first configuration criterion of the first NF node 20 may be that the first NF node 20 is configured to distribute network traffic according to the capacity of the one or more of the second NF nodes in the event that load information is unavailable for at least one of the second NF nodes. In the art, load information may also be referred to as load control information. In other embodiments, the first configuration criterion of the first NF node 20 may be that the first NF node 20 is not configured to support distributing network traffic among the second NF nodes according to the load on the one or more of the second NF nodes.

In some embodiments, where the first configuration criterion of the first NF node 20 is that the first NF node 20 is configured to distribute network traffic according to the capacity of the one or more of the second NF nodes in the event that load information is unavailable for at least one of the second NF nodes, identifying that network traffic for executing the service is to be distributed among the second NF nodes according to the capacity of the one or more of the second NF nodes may comprise, for one or more of the second NF nodes for which load information is unavailable, identifying that network traffic for executing the service is to be distributed among said one or more of the second NF nodes according to the capacity of said one or more of the second NF nodes and/or, for one or more of the second NF nodes for which load information is available, identifying that network traffic for executing the service is to be distributed among said one or more of the second NF nodes according to the capacity of said one or more of the second NF nodes and the load on said one or more of the second NF nodes (i.e. according to the relative load on said one or more of the second NF nodes). For example, if the capacity of a second NF node is known and the load on this second NF node is also known, then it is possible to calculate the unused (or available) capacity of the second NF node.

In some embodiments, the second configuration criterion of at least one of the second NF nodes may be that the at least one of the second NF nodes (or a group of second NF nodes) is configured to require that it receives a predefined amount of network traffic. In some embodiments, a profile of the at least one of the second NF nodes may comprise information indicative that the at least one of the second NF node (or the group of second NF nodes) is configured to require that it receives the predefined amount of network traffic. In some embodiments, the predefined amount of network traffic can be a predefined percentage of a total amount of network traffic available for transmission. In some embodiments, the capacity of the at least one of the second NF nodes may be calculated based on a total capacity of all other second NF nodes and the predefined amount of network traffic. In some embodiments, a profile of at least one of the second NF nodes may comprise information indicative of the capacity of the at least one of the second NF nodes.

In some embodiments, the event that signals that the service is to be executed may comprise the first network node 10, 20 receiving a service request. The service request is a request for the service to be executed. Alternatively or in addition, the event that signals that the service is to be executed may comprise an event internal to the first network node 10, 20 that requires that the service is executed.

In some embodiments, it may be that the network traffic for executing the service is to be distributed among the second NF nodes according to the capacity of the one or more of the second NF nodes by, for each second NF node of the one or more of the second NF nodes, assigning a percentage of the network traffic to the second NF node. In these embodiments, the percentage of the network traffic may be equal to a percentage capacity of the second NF node relative to a total capacity of all second NF nodes.

In some embodiments, it may be that the network traffic for executing the service is to be distributed among the second NF nodes according to the capacity of the one or more of the second NF nodes by, for each second NF node of the one or more of the second NF nodes (or each group of second NF nodes) that is configured to require that it receives a predefined amount of traffic, assigning the predefined amount of traffic to the second NF node (or the group of second NF nodes) and, for all other second NF nodes of the one or more of the second NF nodes, assigning a percentage of the remaining network traffic to those second NF node(s). In these embodiments, the percentage of the network traffic may be equal to a percentage capacity of the second NF node relative to a total capacity of all second NF nodes. Herein, a percentage of network traffic (or remaining network traffic) assigned to a second NF node is the percentage of network traffic (or remaining network traffic) that is to be transmitted to the second NF node.

Although not illustrated in FIG. 3, in some embodiments, the method may comprise, if the first configuration criterion of the first NF node 20 and/or the second configuration criterion of at least one of the second NF nodes is not met, identifying that network traffic for executing the service is to be distributed among the second NF nodes according to a load on one or more of the second NF nodes.

There is also provided a method performed by a system. The method comprises the method described herein in respect of the first network node 10, 20 and the method described herein in respect of any one or more of the other nodes. There is also provided a system comprising at least one first network node 10, 20 as described herein and any one or more of the other nodes as described herein.

Figure 4:
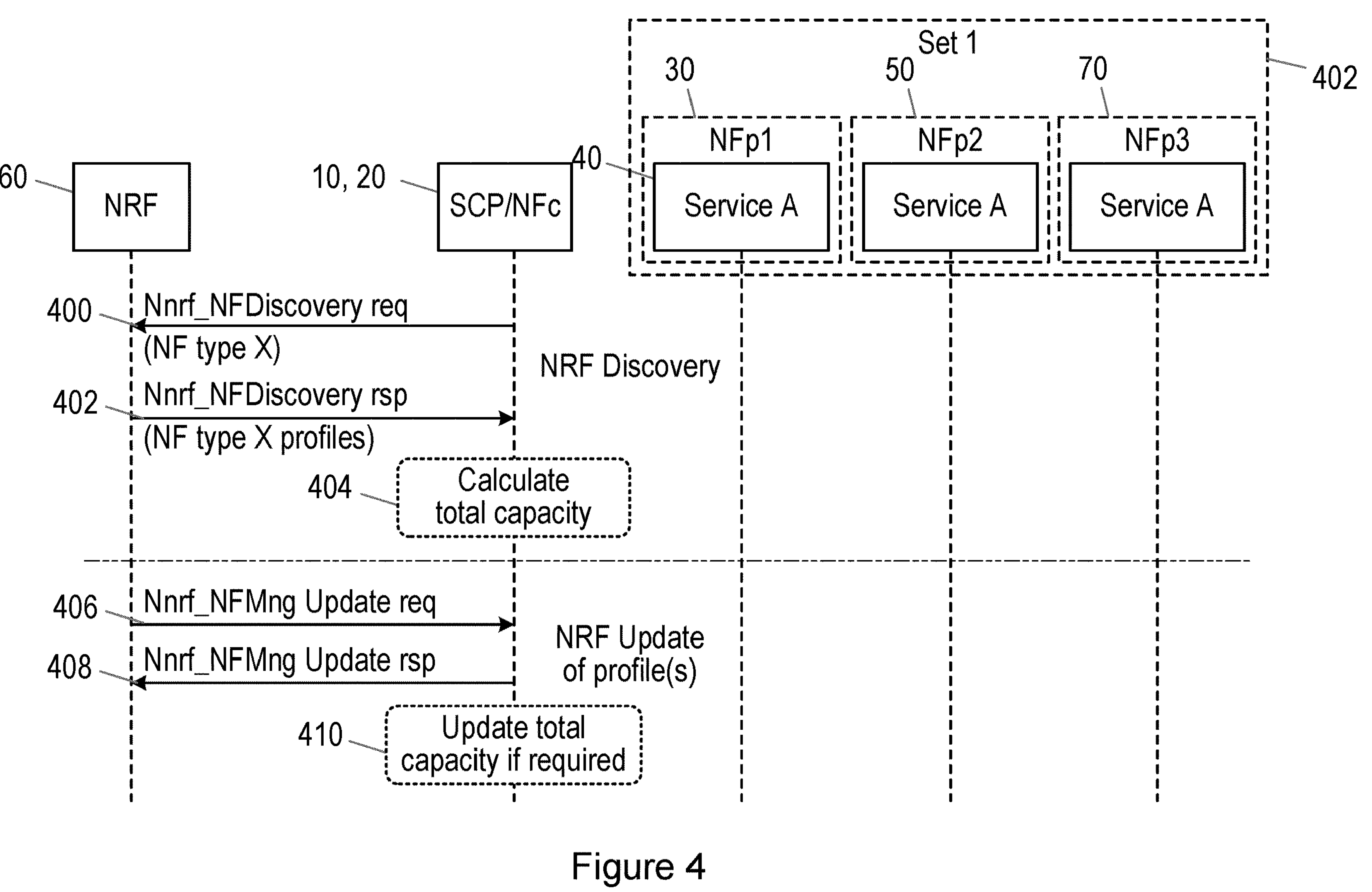
FIG. 4 is a signalling diagram illustrating an exchange of signals in a system according to an embodiment.

FIG. 4 is a signalling diagram illustrating an exchange of signals in a system according to an embodiment. The system illustrated in FIG. 4 comprises a first network node 10, 20, second NF nodes 30, 50, 70 of a service producer ("NFp1", "NFp2", "NFp3"), and an NRF node 60. The first network node 10, 20 can be as described earlier with reference to FIGS. 2 and 3. The first network node 10, 20 can be a first SCP node 10 ("SCP") or a first NF node 20 of a first service consumer ("NFc"). Although not illustrated in FIG. 4, in some embodiments where the first network node 10 is a first SCP node 10, the system may also comprise a first NF node 20. The first SCP node 10 can be configured to operate as an SCP between the first NF node 20 and second NF nodes 30, 50, 70.

The second NF nodes 30, 50, 70 can each be for providing, e.g. configured to provide, a service 40 ("Service A"). In some embodiments, as illustrated in FIG. 4, a group (or set) 402 of second NF nodes ("Set 1") may comprise the second NF nodes 30, 50, 70. Although three second NF nodes 30, 50, 70 are illustrated in FIG. 4, it will be understood that the group 402 of second NF nodes may comprise a single second NF node according to some embodiments or a plurality of (e.g. two, three or more) second NF nodes according to other embodiments.

In some embodiments where the system comprises the first SCP node 10, an entity may comprise the first SCP node 10 and the NRF node 60. That is, in some embodiments, the first SCP node 10 can be merged with the NRF node 60 in a combined entity. Generally, an NRF node 60 is a node that provides NF service registration and discovery. An NRF node 60 thus enables NF nodes to identify services offered by other NF nodes.

Although only one first network node 10, 20 (e.g. one first SCP node 10 or one first NF node 20) is illustrated in FIG. 4, the system can comprise one or more first network nodes (e.g. one or more first SCP nodes 10 and/or one or more first NF nodes 20). Similarly, although only one group (or set) 402 of second NF nodes 30, 50, 70 is illustrated in FIG. 4, the system can comprise one or more groups (or sets) of second NF nodes. In some embodiments, the second NF nodes 30, 50, 70 may be grouped according to the type of NF node and/or according to a service that they can provide. For example, second NF nodes 30, 50, 70 of the same type and/or that can provide the same service 40 can be part of the same group 402.

In some embodiments, the first SCP node 10 and the first NF node 20 may be deployed in independent deployment units and/or the first SCP node 10 and at least one of the second NF nodes 30, 50, 70 may be deployed in independent deployment units. Thus, an SCP node based on independent deployment units is possible, as described in 3GPP TS 23.501 V16.4.0. In other embodiments, the first SCP node 10 may be deployed as a distributed network element. For example, in some embodiments, part (e.g. a service agent) of the first SCP node 10 may be deployed in the same deployment unit as the first NF node 20 and/or part (e.g. a service agent) of the first SCP node 10 may be deployed in the same deployment unit as at least one of the second NF nodes 30, 50, 70. Thus, an SCP node based on a service mesh is possible, as described in 3GPP TS 23.501 V16.4.0.

In some embodiments, at least one second SCP node may be configured to operate as an SCP between the first NF node 20 and the first SCP node 10 and/or at least one third SCP node may be configured to operate as an SCP between the first SCP node 10 and at least one of the second NF nodes 30, 50, 70. Thus, a multipath of SCP nodes is possible. In some of these embodiments, the first SCP node 10 and one or more of the at least one second SCP node and the at least one third SCP node may be deployed in independent deployment units. In some embodiments, the at least one second SCP node and/or the at least one third SCP node may be deployed as distributed network elements.

As illustrated by arrows 400 and 402 of FIG. 4, a discovery process may be performed according to some embodiments. In more detail, as illustrated by arrow 400 of FIG. 4, in some embodiments, the first network node 10, 20 may initiate transmission of (e.g. itself transmit or cause another node to transmit, such as via its communications interface 16) a discovery request towards the NRF node 60. The NRF node 60 thus receives this discovery request 400. The discovery request 400 is a request for information indicative of one or more second NF nodes of one or more service producers, such as all available second NF nodes. The discovery request 400 can comprise discovery and/or selection parameter(s). For example, the discovery request 400 can comprise a parameter indicative of a type ("NF type X") of second NF node to be discovered. The NRF node 60 can discover profiles of possible destination second NF nodes based on the discovery parameter(s).

As illustrated by arrow 402 of FIG. 4, in some embodiments, the NRF node 60 may initiate transmission of (e.g. itself transmit or cause another node to transmit, such as via its communications interface 16) a discovery response towards the first network node 10, 20. The discovery response 402 can be indicative of one or more second NF nodes 30, 50, 70, such as all available second NF nodes. In embodiments where the discovery request 400 comprises a parameter indicative of a type ("NF type X") of second NF node to be discovered, the discovery response 402 can be indicative of one or more second NF nodes 30, 50, 70 (e.g. all available second NF nodes) of that type. In some embodiments, the discovery response 402 may comprise a profile of each of the one or more second NF nodes 30, 50, 70. The one or more second NF nodes 30, 50, 70 may be part of the same group 402 of second NF nodes. The discovery response 402 (e.g.

the profile of each of the one or more second NF nodes 30, 50, 70) can comprise information indicative of a capacity of each of the one or more second NF nodes 30, 50, 70.

As illustrated by block 404 of FIG. 4, in some embodiments, the first network node 10, 20 may calculate a total capacity of the one or more second NF nodes 30, 50, 70. Specifically, the first network node 10, 20 may calculate the total capacity of the one or more second NF nodes 30, 50, 70 as a sum of the capacity of each of the one or more second NF nodes 30, 50, 70. An example of this calculation is, as follows:

Capacity = 19660　　NFp1

Capacity = 26213　　NFp2

-continued

| | |
|---|---|
| Capacity = 6553 | NFp3 |

Total Capacity = 6553 + 19660 + 26213 = 52426

This total capacity of the one or more second NF nodes 30, 50, 70 can be used to calculate a percentage of network traffic to be transmitted to each of the one or more second NF nodes 30, 50, 70, as will be described later.

In some embodiments, whenever there is a change to the capacity of one or more second NF nodes 30, 50, 70, the total capacity may be recalculated. There may be a change to the capacity of one or more second NF nodes 30, 50, 70, for example, where one or more additional second NF nodes are deployed (as this causes an increase in the capacity), where one or more second NF nodes are no longer available or are no longer deployed (as this causes a decrease in the capacity), and/or where the capacity of one or more second NF nodes is modified (as this can cause an increase or decrease in the capacity). Thus, as illustrated by arrow 406 of FIG. 4, in some embodiments, the NRF node 60 may initiate transmission of (e.g. itself transmits or causes another node to transmit, such as via its communications interface 16) an update request towards the first network node 10, 20. The update request 406 is a request to update the capacity of one or more of the second NF nodes 30, 50, 70, e.g. since more or less capacity may be available through the above-mentioned change(s). The update request 406 can be indicative of the updated capacity. In some embodiments, the update request 406 may comprise a profile of each one or more second NF nodes and the profile may comprise the updated capacity. Thus, the first network node 10, 20 can be notified of any change to capacity according to some embodiments.

As illustrated by arrow 408 of FIG. 4, in some embodiments, the first network node 10, 20 may initiate transmission of (e.g. itself transmit or cause another node to transmit, such as via its communications interface 16) an update response towards the NRF node 60. The update response 408 may, for example, acknowledge receipt of the update request 406 and/or that capacity will be updated. As illustrated by block 410 of FIG. 4, in some embodiments, the first network node 10, 20 may calculate an updated total capacity of the one or more second NF nodes 30, 50, 70 in view of the change. That is, the total capacity can be recalculated if required. This updated total capacity can be used to calculate an updated percentage of network traffic to be transmitted to each of the one or more second NF nodes 30, 50, 70, as will be described later. In this way, all capacity can be taken into account for any network traffic distribution (e.g. for any potential load balancing).

As mentioned earlier, the total capacity of the one or more second NF nodes 30, 50, 70 can be used to calculate a percentage of network traffic to be transmitted to each of the one or more second NF nodes 30, 50, 70. For example, as also mentioned earlier, in some embodiments, it may be that the network traffic for executing the service 40 is to be distributed among the second NF nodes 30, 50, 70 according to the capacity of the one or more of the second NF nodes 30, 50, 70 by, for each second NF node of the one or more of the second NF nodes 30, 50, 70, assigning a percentage of the network traffic to the second NF node 30, 50, 70 and this percentage can be equal to a percentage capacity of the second NF node 30, 50, 70 relative to the total capacity of all second NF nodes 30, 50, 70.

In an example of this, the following capacity information indicative of a capacity of each of the second NF nodes 30, 50, 70 and load information (or metric) indicative of a load on two of the second NF nodes 30, 50 is available to the first network node 10, 20:

| | |
|---|---|
| Capacity = 19660, Load-metric = 50% | NFp1 |
| Capacity = 26213, Load-metric = 50% | NFp2 |
| Capacity = 6553 | NFp3 |

Total capacity: 6553 + 19660 + 26213 = 52426

The first network node 10, 20 may identify (e.g. based on the configuration of the first NF node 20 and/or the configuration of at least one second NF node 30, 50, 70) that it is to ignore the signalled load information (or metric) for all second NF nodes 30, 50, 70 and it is to instead distribute network traffic based on capacity. That is, the first network node 10, 20 may identify that it is to distribute network traffic among the second NF nodes 30, 50, 70 according to the capacity of the one or more of the second NF nodes 30, 50, 70 irrespective of a load on each of the second NF nodes 30, 50, 70.

For each of the second NF nodes 30, 50, 70, a percentage capacity of the second NF node 30, 50, 70 relative to the total capacity of all second NF nodes 30, 50, 70 is calculated, as follows:

| | |
|---|---|
| $(19660\times 100)/52426 = 37.5\%$ | NFp1 |
| $(26213\times 100)/52426 = 50\%$ | NFp2 |
| $(6553\times 100)/52426 = 12.5\%$ | NFp3 |

The total amount of network traffic (100%) is to distributed among the second NF nodes 30, 50, 70 according to the capacity of the one or more of the second NF nodes 30, 50, 70. Thus, the percentage capacities calculated above are used as the percentage of network traffic to be assigned to (and optionally also transmitted towards) the respective second NF nodes 30, 50, 70. The same method may be performed whenever a capacity of one or more second NF nodes is updated, e.g. as notified at arrow 406 of FIG. 4.

As mentioned earlier, in other embodiments, it may be that the network traffic for executing the service 40 is to be distributed among the second NF nodes 30, 50, 70 according to the capacity of the one or more of the second NF nodes 30, 50, 70 by, for each second NF node of the one or more of the second NF nodes 30, 50, 70 that is configured to require that it receives a predefined amount of network traffic, assigning the predefined amount of traffic to the second NF node. The capacity of each second NF node that is configured to require that it receives a predefined amount of network traffic is a percentage of the total (or maximum) capacity of second NF nodes and this percentage, in comparison to the rest of the second NF nodes, represents the percentage of traffic that this second NF node is to receive. For all other second NF nodes of the one or more of the second NF nodes, a percentage of the remaining network traffic can be assigned to the other second NF node(s). In these embodiments, the percentage may be equal to a percentage capacity of the second NF node relative to a total capacity of all second NF nodes 30, 50, 70.

In an example of this, it may be that a second NF node 30 is configured to require that it receives 5% of a total amount of network traffic (e.g. for testing, such as canary testing, where a certain second NF node is required to receive a percentage of network traffic). Therefore, 5% of the total amount of network traffic is assigned to this second NF node 30. The remaining 95% of network traffic can then be assigned to the other second NF nodes 30, 50. The capacity of the second NF node 30 that requires 5% of the total amount of network traffic may be calculated according to the following equation:

$$(NFp1\ \text{Capacity}) = (\text{Total capacity of other } NFps) \times \frac{5\%}{(1-5\%)}$$

This capacity is the capacity of the second NF node 30 that achieves the required percentage of the total amount of network traffic. The first network node 10, 20 can then determine the relative capacity of each of the other second NF nodes 50, 70 and interpret it as a traffic percentage. The percentage of traffic towards the second NF node 30 (that requires that it receives a predefined percentage of the total amount of network traffic) can remain stable, while the rest of the network traffic can be distributed among the other second NF nodes 50, 70 according to the capacity among those other second NF nodes 50, 70 (e.g. taking into account that not all may be available or reachable at any point in time). The aim may be to proceed all network traffic (100%), while only the required percentage of network traffic is assigned to the second NF node 30.

Figure 5:
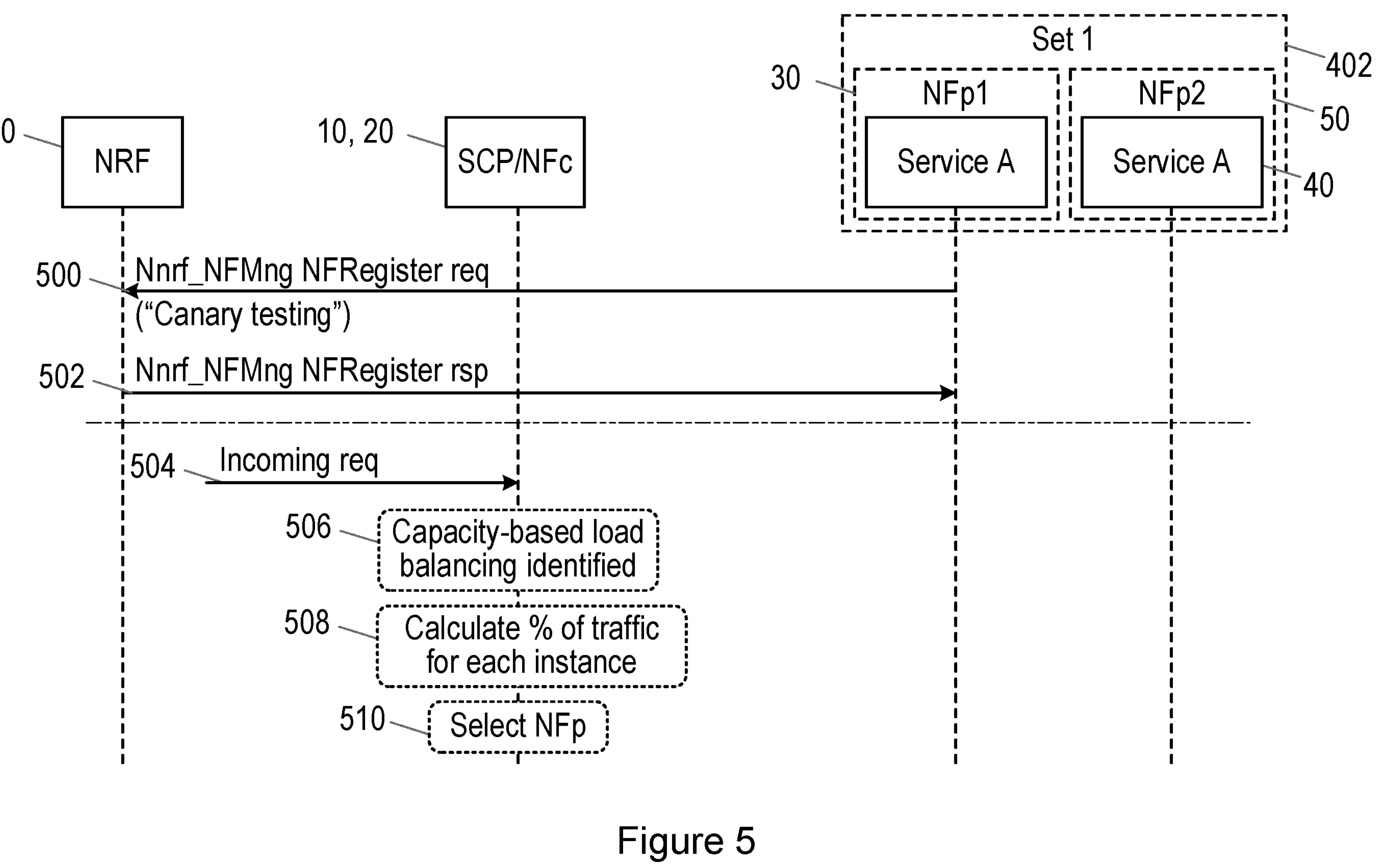
FIG. 5 is a signalling diagram illustrating an exchange of signals in a system according to an embodiment.

FIG. 5 is a signalling diagram illustrating an exchange of signals in a system according to an embodiment. The system illustrated in FIG. 5 comprises a first network node 10, 20, second NF nodes 30, 50 of a service producer ("NFp1", "NFp2"), and an NRF node 60. The first network node 10, 20 can be as described earlier with reference to FIGS. 2 and 3. The first network node 10, 20 can be a first SCP node 10 ("SCP") or a first NF node 20 of a first service consumer ("NFc"). Although not illustrated in FIG. 5, in some embodiments where the first network node 10 is a first SCP node 10, the system may also comprise a first NF node 20. The first SCP node 10 can be configured to operate as an SCP between the first NF node 20 and second NF nodes 30, 50.

The second NF nodes 30, 50 can each be for providing, e.g. configured to provide, a service 40 ("Service A"). In some embodiments, as illustrated in FIG. 5, a group (or set) 402 of second NF nodes ("Set 1") may comprise the second NF nodes 30, 50. Although two second NF nodes 30, 50 are illustrated in FIG. 5, it will be understood that the group 402 of second NF nodes may comprise a single second NF node according to some embodiments or a plurality of (e.g. two, three or more) second NF nodes according to other embodiments.

In some embodiments where the system comprises the first SCP node 10, an entity may comprise the first SCP node 10 and the NRF node 60. That is, in some embodiments, the first SCP node 10 can be merged with the NRF node 60 in a combined entity. Generally, an NRF node 60 is a node that provides NF service registration and discovery. An NRF node 60 thus enables NF nodes to identify services offered by other NF nodes.

Although only one first network node 10, 20 (e.g. one first SCP node 10 or one first NF node 20) is illustrated in FIG. 5, the system can comprise one or more first network nodes (e.g. one or more first SCP nodes 10 and/or one or more first NF nodes 20). Similarly, although only one group (or set) 402 of second NF nodes 30, 50 is illustrated in FIG. 5, the system can comprise one or more groups (or sets) of second NF nodes. In some embodiments, the second NF nodes 30, 50 may be grouped according to the type of NF node.

In some embodiments, the first SCP node 10 and the first NF node 20 may be deployed in independent deployment units and/or the first SCP node 10 and at least one of the second NF nodes 30, 50 may be deployed in independent deployment units. Thus, an SCP node based on independent deployment units is possible, as described in 3GPP TS 23.501 V16.4.0. In other embodiments, the first SCP node 10 may be deployed as a distributed network element. For example, in some embodiments, part (e.g. a service agent) of the first SCP node 10 may be deployed in the same deployment unit as the first NF node 20 and/or part (e.g. a service agent) of the first SCP node 10 may be deployed in the same deployment unit as at least one of the second NF nodes 30, 50. Thus, an SCP node based on a service mesh is possible, as described in 3GPP TS 23.501 V16.4.0.

In some embodiments, at least one second SCP node may be configured to operate as an SCP between the first NF node 20 and the first SCP node 10 and/or at least one third SCP node may be configured to operate as an SCP between the first SCP node 10 and at least one of the second NF nodes 30, 50. Thus, a multipath of SCP nodes is possible. In some of these embodiments, the first SCP node 10 and one or more of the at least one second SCP node and the at least one third SCP node may be deployed in independent deployment units. In some embodiments, the at least one second SCP node and/or the at least one third SCP node may be deployed as distributed network elements.

As illustrated by arrow 500 of FIG. 5, in some embodiments, a second NF node 30 may register itself with the NRF node 60. More specifically, in some embodiments, the second NF node 30 may initiate transmission of (e.g. itself transmit or cause another node to transmit, such as via its communications interface) a register request 500 towards the NRF node 60. The register request 500 is a request for the second NF node 30 to be registered with the NRF node 60. If the second NF node 30 is configured to require that it receives a predefined amount of network traffic (or load), then the register request 500 can comprise an indication (e.g. a flag) that this is the case. The second NF node 30 may, for example, be configured to require that it receives the predefined amount of network traffic to perform testing (e.g. canary testing). Thus, in some embodiments, the register request 500 can be a request for the second NF node 30 to be registered with the NRF node 60 as performing testing. In some embodiments, an operator may require that the second NF node 30 receives the predefined amount of network traffic.

Although not illustrated in FIG. 5, the NRF node 60 can register the second NF node 30. For example, the NRF node 60 may store a profile of the second NF node 30. If relevant, the profile of the second NF node 30 may comprise information indicative that the second NF node 30 is configured to require that it receives the predefined amount of network traffic and/or that the second NF node 30 is performing testing. As illustrated by arrow 502 of FIG. 5, in some embodiments, the NRF node 60 may initiate transmission of (e.g. itself transmit or cause another node to transmit, such as via its communications interface) a response to the register request 500 towards the first network node 10, 20. The response 502 can comprise information indicative that the NRF node 60 received the register request 500 and/or information indicative that second NF node 30 is registered with the NRF node 60.

In some embodiments, the method that follows may be performed in response to an event that signals that a service 40 is to be executed (e.g. provided). For example, in some embodiments, as illustrated by arrow 504 of FIG. 5, the first network node 10, 20 may receive an incoming request from another node (which is not illustrated in FIG. 5), e.g. a user equipment (UE), or the first NF node 20 where the first network node is the first SCP node 10, or any other node. Thus, in some embodiments, the event may comprise the first network node 10, 20 receiving an incoming request 504. The incoming request 504 may, for example, be a service request, which is a request for the service 40 to be executed. Although not illustrated in FIG. 5, in other embodiments, the event may comprise an event internal to the first network node 10, 20 that requires that the service 40 is executed.

If a first configuration criterion of the first NF node 20 and/or a second configuration criterion of at least one of the second NF nodes 30, 50 is met, then the first network node 10, 20 identifies that network traffic for executing the service 40 is to be distributed among the second NF nodes 30, 50 according to a capacity of one or more of the second NF nodes 30, 50. The first configuration criterion of the first NF node 20 can be any of those mentioned earlier. The second configuration criterion of at least one of the second NF nodes 30, 50 can be that the at least one of the second NF nodes 30, 50 (e.g. of a particular type) is configured to require that it receives a predefined amount of network traffic (e.g. for testing). In some embodiments, the first network node 10, 20 can check if the second configuration criterion is met for at least one second NF node 30, 50 by checking the profile of the second NF nodes 30, 50.

In the embodiment illustrated in FIG. 5, the second configuration criterion of at least one of the second NF node 30, 50 is met since the second NF node 30 is configured to require that it receives a predefined amount of network traffic. Thus, as illustrated by block 506 of FIG. 5, the first network node 10, 20 identifies that network traffic for executing the service 40 is to be distributed among the second NF nodes 30, 50 according to the capacity of one or more of the second NF nodes 30, 50. For example, the first network node 10, 20 may identify that network traffic for executing the service 40 is to be distributed among the second NF nodes 30, 50 according to the capacity of one or more of the second NF nodes 30, 50, such that the network traffic is load balanced among the second NF nodes 30, 50. Thus, the first network node 10, 20 may identify that it has to perform capacity based load balancing. In some embodiments, when the first network node 10, 20 identifies this, the first network node 10, 20 may ignore the load on the second NF nodes 30, 50 (e.g. even if load information for the second NF nodes 30, 50 is available).

In some embodiments, it may be that the network traffic for executing the service 40 is to be distributed among the second NF nodes 30, 50 according to the capacity of the one or more of the second NF nodes 30, 50 by, for the second NF node 30 that is configured to require that it receives a predefined amount of network traffic, assigning the predefined amount of traffic to that second NF node 30. For all other second NF nodes 50 of the one or more of the second NF nodes, a percentage of the remaining network traffic to the second NF node may be assigned. In some embodiments, the percentage may be equal to a percentage capacity of the second NF node 50 relative to a total capacity of all second NF nodes 30, 50. Thus, as illustrated by block 508 of FIG. 5, in some embodiments, the first network node 10, 20 may calculate this percentage for each of the other second NF nodes 50 of the one or more of the second NF nodes 30, 50. The total capacity of all second NF nodes 30, 50 used in this calculation can, for example, be calculated in the manner described earlier with reference to FIG. 4.

As illustrated by block 510 of FIG. 5, in some embodiments, the first network node 10, 20 may select a second NF node of the one or more of the second NF nodes 30, 50 towards which the incoming request 504 is to be transmitted. This selection can be based on the percentage of traffic assigned to each second NF node 30, 50. For example, the first network node 10, 20 may select a second NF node that has not yet received the percentage of network traffic assigned to it. Once a second NF node is selected, the request can then proceed in the usual way.

Figure 6:
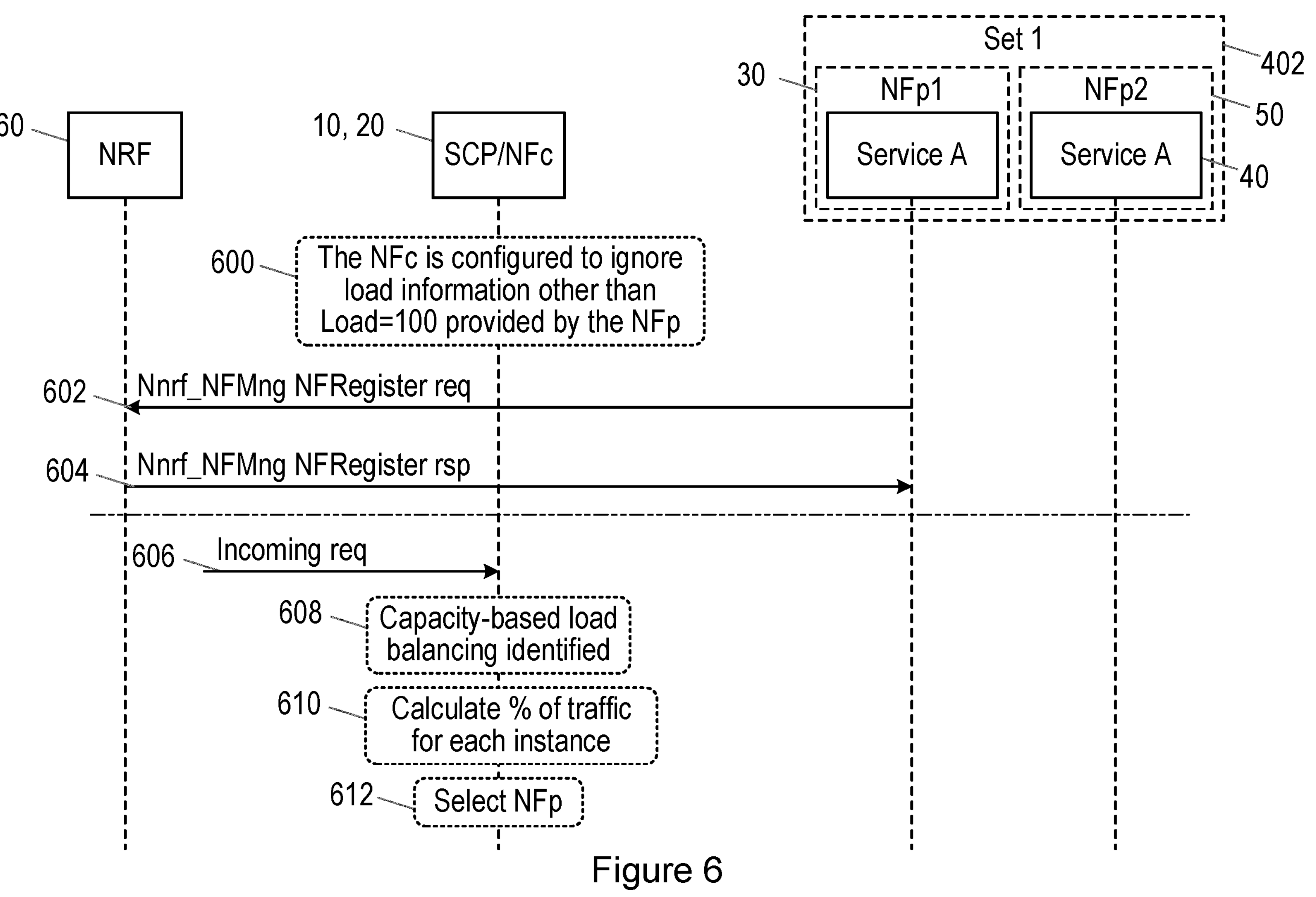
FIG. 6 is a signalling diagram illustrating an exchange of signals in a system according to an embodiment.

FIG. 6 is a signalling diagram illustrating an exchange of signals in a system according to an embodiment. The system illustrated in FIG. 6 comprises a first network node 10, 20, second NF nodes 30, 50 of a service producer ("NFp1", "NFp2"), and an NRF node 60. The first network node 10, 20 can be as described earlier with reference to FIGS. 2 and 3. The first network node 10, 20 can be a first SCP node 10 ("SCP") or a first NF node 20 of a first service consumer ("NFc"). Although not illustrated in FIG. 6, in some embodiments where the first network node 10 is a first SCP node 10, the system may also comprise a first NF node 20. The first SCP node 10 can be configured to operate as an SCP between the first NF node 20 and second NF nodes 30, 50.

The second NF nodes 30, 50 can each be for providing, e.g. configured to provide, a service 40 ("Service A"). In some embodiments, as illustrated in FIG. 6, a group (or set) 402 of second NF nodes ("Set 1") may comprise the second NF nodes 30, 50. Although two second NF nodes 30, 50 are illustrated in FIG. 6, it will be understood that the group 402 of second NF nodes may comprise a single second NF node according to some embodiments or a plurality of (e.g. two, three or more) second NF nodes according to other embodiments.

In some embodiments where the system comprises the first SCP node 10, an entity may comprise the first SCP node 10 and the NRF node 60. That is, in some embodiments, the first SCP node 10 can be merged with the NRF node 60 in a combined entity. Generally, an NRF node 60 is a node that provides NF service registration and discovery. An NRF node 60 thus enables NF nodes to identify services offered by other NF nodes.

Although only one first network node 10, 20 (e.g. one first SCP node 10 or one first NF node 20) is illustrated in FIG. 6, the system can comprise one or more first network nodes (e.g. one or more first SCP nodes 10 and/or one or more first NF nodes 20). Similarly, although only one group (or set) 402 of second NF nodes 30, 50 is illustrated in FIG. 6, the system can comprise one or more groups (or sets) of second NF nodes. In some embodiments, the second NF nodes 30, 50 may be grouped according to the type of NF node.

In some embodiments, the first SCP node 10 and the first NF node 20 may be deployed in independent deployment units and/or the first SCP node 10 and at least one of the second NF nodes 30, 50 may be deployed in independent deployment units. Thus, an SCP node based on independent deployment units is possible, as described in 3GPP TS 23.501 V16.4.0. In other embodiments, the first SCP node 10 may be deployed as a distributed network element. For example, in some embodiments, part (e.g. a service agent) of the first SCP node 10 may be deployed in the same deployment unit as the first NF node 20 and/or part (e.g. a service agent) of the first SCP node 10 may be deployed in the same deployment unit as at least one of the second NF nodes 30, 50. Thus, an SCP node based on a service mesh is possible, as described in 3GPP TS 23.501 V16.4.0.

In some embodiments, at least one second SCP node may be configured to operate as an SCP between the first NF node 20 and the first SCP node 10 and/or at least one third SCP node may be configured to operate as an SCP between the first SCP node 10 and at least one of the second NF nodes 30, 50. Thus, a multipath of SCP nodes is possible. In some of these embodiments, the first SCP node 10 and one or more of the at least one second SCP node and the at least one third SCP node may be deployed in independent deployment units. In some embodiments, the at least one second SCP node and/or the at least one third SCP node may be deployed as distributed network elements.

As illustrated by block 600 of FIG. 6, in some embodiments, the first NF node 20 may be configured to ignore load information unless the load on at least one of the second NF nodes 30, 50 is a maximum load (e.g. represented by a value of 100) that the at least one of the second NF nodes 30, 50 is capable of handling. Thus, in some embodiments, the first NF node 20 can be configured to distribute network traffic according to the capacity of the one or more of the second NF nodes 30, 50 irrespective of the load on each of the second NF nodes 30, 50 unless the load on at least one of the second NF nodes 30, 50 is the maximum load that the at least one of the second NF nodes 30, 50 is capable of handling.

As illustrated by arrow 602 of FIG. 6, in some embodiments, a second NF node 30 may register itself with the NRF node 60. More specifically, in some embodiments, the second NF node 30 may initiate transmission of (e.g. itself transmit or cause another node to transmit, such as via its communications interface) a register request 602 towards the NRF node 60. The register request 602 is a request for the second NF node 30 to be registered with the NRF node 60. Although not illustrated in FIG. 6, the NRF node 60 can register the second NF node 30. For example, the NRF node 60 may store a profile of the second NF node 30. In some embodiments, the register request 602 may comprise capacity information indicative of a capacity of the second NF node 30 and/or load information indicative of a load on the second NF node 30. In these embodiments, the capacity information and/or load information may be registered for the second NF node 30 (e.g. stored in the profile of the second NF node 30).

As illustrated by arrow 604 of FIG. 6, in some embodiments, the NRF node 60 may initiate transmission of (e.g. itself transmit or cause another node to transmit, such as via its communications interface) a response to the register request 602 towards the first network node 10, 20. The response 604 can comprise information indicative that the NRF node 60 received the register request 602 and/or information indicative that second NF node 30 is registered with the NRF node 60.

In some embodiments, the method that follows may be performed in response to an event that signals that a service 40 is to be executed (e.g. provided). For example, in some embodiments, as illustrated by arrow 606 of FIG. 6, the first network node 10, 20 may receive an incoming request from another node (which is not illustrated in FIG. 6), e.g. a user equipment (UE), or the first NF node 20 where the first network node is the first SCP node 10, or any other node. Thus, in some embodiments, the event may comprise the first network node 10, 20 receiving an incoming request 606. The incoming request 606 may, for example, be a service request, which is a request for the service 40 to be executed.

Although not illustrated in FIG. 6, in other embodiments, the event may comprise an event internal to the first network node 10, 20 that requires that the service 40 is executed.

If a first configuration criterion of the first NF node 20 and/or a second configuration criterion of at least one of the second NF nodes 30, 50 is met, then the first network node 10, 20 identifies that network traffic for executing the service 40 is to be distributed among the second NF nodes 30, 50 according to a capacity of one or more of the second NF nodes 30, 50. The second configuration criterion of at least one of the second NF nodes 30, 50 can be that mentioned earlier. The first configuration criterion of the first NF node 20 can also be any of those mentioned earlier including that the first NF node 20 is configured to distribute network traffic according to the capacity of the one or more of the second NF nodes 30, 50 irrespective of the load on each of the second NF nodes 30, 50, unless the load on at least one of the second NF nodes 30, 50 is a maximum load that the at least one of the second NF nodes 30, 50 is capable of handling.

In the embodiment illustrated in FIG. 6, this first configuration criterion of the first NF node 20 is met. Thus, as illustrated by block 608 of FIG. 6, the first network node 10, 20 identifies that network traffic for executing the service 40 is to be distributed among the second NF nodes 30, 50 according to the capacity of one or more of the second NF nodes 30, 50. For example, the first network node 10, 20 may identify that network traffic for executing the service 40 is to be distributed among the second NF nodes 30, 50 according to the capacity of one or more of the second NF nodes 30, 50, such that the network traffic is load balanced among the second NF nodes 30, 50. Thus, the first network node 10, 20 may identify that it has to perform capacity based load balancing.

In some embodiments, when the first network node 10, 20 identifies this, the first network node 10, 20 may ignore the load on the second NF nodes 30, 50 (e.g. even if load information for the second NF nodes 30, 50 is available).

In some embodiments, it may be that the network traffic for executing the service 40 is to be distributed among the second NF nodes 30, 50 according to the capacity of the one or more of the second NF nodes 30, 50 by, for each second NF node of the one or more of the second NF nodes 30, 50, assigning a percentage of the network traffic to the second NF node. In these embodiments, the percentage is equal to a percentage capacity of the second NF node relative to a total capacity of all second NF nodes 30, 50. Thus, as illustrated by block 610 of FIG. 6, in some embodiments, the first network node 10, 20 may calculate this percentage for each second NF node of the one or more of the second NF nodes 30, 50. The total capacity of all second NF nodes 30, 50 used in this calculation can, for example, be calculated in the manner described earlier with reference to FIG. 4.

As illustrated by block 612 of FIG. 6, in some embodiments, the first network node 10, 20 may select a second NF node of the one or more of the second NF nodes 30, 50 towards which the incoming request 606 is to be transmitted. This selection can be based on the percentage of traffic assigned to each second NF node 30, 50. For example, the first network node 10, 20 may select a second NF node that has not yet received the percentage of network traffic assigned to it. Once a second NF node is selected, the request can then proceed in the usual way.

Figure 7:
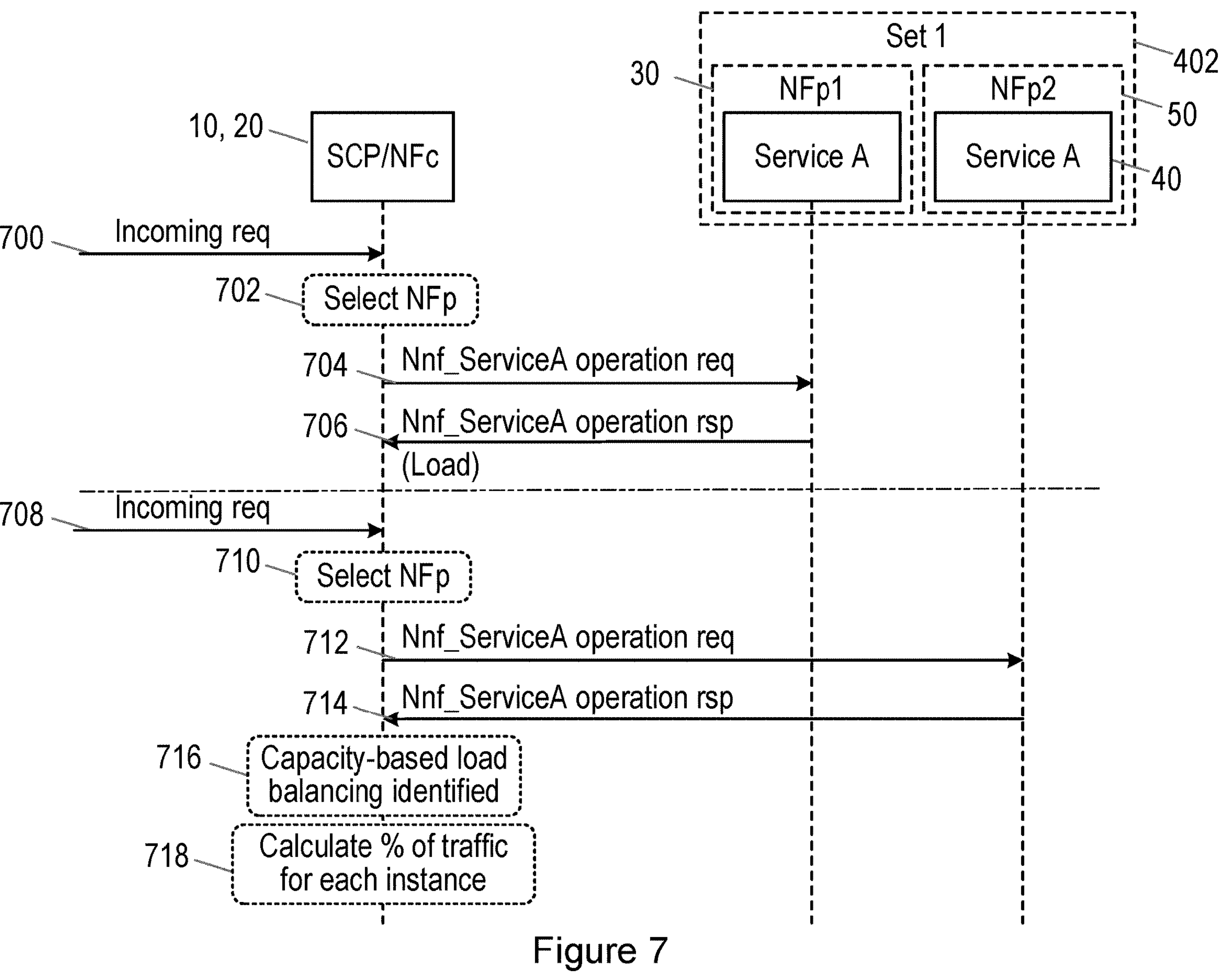
FIG. 7 is a signalling diagram illustrating an exchange of signals in a system according to an embodiment.

FIG. 7 is a signalling diagram illustrating an exchange of signals in a system according to an embodiment. The system illustrated in FIG. 7 comprises a first network node 10, 20, and second NF nodes 30, 50 of a service producer ("NFp1", "NFp2"). The first network node 10, 20 can be as described earlier with reference to FIGS. 2 and 3. The first network node 10, 20 can be a first SCP node 10 ("SCP") or a first NF node 20 of a first service consumer ("NFc"). Although not illustrated in FIG. 7, in some embodiments where the first network node 10 is a first SCP node 10, the system may also comprise a first NF node 20. The first SCP node 10 can be configured to operate as an SCP between the first NF node 20 and second NF nodes 30, 50.

The second NF nodes 30, 50 can each be for providing, e.g. configured to provide, a service 40 ("Service A"). In some embodiments, as illustrated in FIG. 7, a group (or set) 402 of second NF nodes ("Set 1") may comprise the second NF nodes 30, 50. Although two second NF nodes 30, 50 are illustrated in FIG. 7, it will be understood that the group 402 of second NF nodes may comprise a single second NF node according to some embodiments or a plurality of (e.g. two, three or more) second NF nodes according to other embodiments.

Although not illustrated in FIG. 7, in some embodiments, the system may also comprise an NRF node. In some of these embodiments where the system comprises the first SCP node 10, an entity may comprise the first SCP node 10 and the NRF node. That is, in some embodiments, the first SCP node 10 can be merged with the NRF node in a combined entity. Generally, an NRF node is a node that provides NF service registration and discovery. An NRF node thus enables NF nodes to identify services offered by other NF nodes.

Although only one first network node 10, 20 (e.g. one first SCP node 10 or one first NF node 20) is illustrated in FIG. 7, the system can comprise one or more first network nodes (e.g. one or more first SCP nodes 10 and/or one or more first NF nodes 20). Similarly, although only one group (or set) 402 of second NF nodes 30, 50 is illustrated in FIG. 7, the system can comprise one or more groups (or sets) of second NF nodes.

In some embodiments, the second NF nodes 30, 50 may be grouped according to the type of NF node.

In some embodiments, the first SCP node 10 and the first NF node 20 may be deployed in independent deployment units and/or the first SCP node 10 and at least one of the second NF nodes 30, 50 may be deployed in independent deployment units. Thus, an SCP node based on independent deployment units is possible, as described in 3GPP TS 23.501 V16.4.0. In other embodiments, the first SCP node 10 may be deployed as a distributed network element. For example, in some embodiments, part (e.g. a service agent) of the first SCP node 10 may be deployed in the same deployment unit as the first NF node 20 and/or part (e.g. a service agent) of the first SCP node 10 may be deployed in the same deployment unit as at least one of the second NF nodes 30, 50. Thus, an SCP node based on a service mesh is possible, as described in 3GPP TS 23.501 V16.4.0.

In some embodiments, at least one second SCP node may be configured to operate as an SCP between the first NF node 20 and the first SCP node 10 and/or at least one third SCP node may be configured to operate as an SCP between the first SCP node 10 and at least one of the second NF nodes 30, 50. Thus, a multipath of SCP nodes is possible. In some of these embodiments, the first SCP node 10 and one or more of the at least one second SCP node and the at least one third SCP node may be deployed in independent deployment units. In some embodiments, the at least one second SCP node and/or the at least one third SCP node may be deployed as distributed network elements.

In some embodiments, the method that follows may be performed in response to an event that signals that a service 40 is to be executed (e.g. provided). For example, in some embodiments, as illustrated by arrow 700 of FIG. 7, the first network node 10, 20 may receive an incoming request from another node (which is not illustrated in FIG. 7), e.g. a user equipment (UE), or the first NF node 20 where the first network node is the first SCP node 10, or any other node. Thus, in some embodiments, the event may comprise the first network node 10, 20 receiving an incoming request 700. Although not illustrated in FIG. 7, in other embodiments, the event may comprise an event internal to the first network node 10, 20 that requires that the service 40 is executed.

In the embodiment illustrated in FIG. 7, the incoming request 700 is a service request, which is a request for the service 40 to be executed. It is assumed that network traffic has only now started and thus the first network node 10, 20 has not yet received any information from any of the second NF nodes 30, 50. As illustrated by block 702 of FIG. 7, in some embodiments, the first network node 10, 20 can select a second NF node 30 in order to proceed network traffic. A person skilled in the art will be aware of various criteria on the basis of which the selection can be performed.

As illustrated by arrow 704 of FIG. 7, in some embodiments, the first network node 10, 20 may initiate transmission of (e.g. itself transmit or cause another node to transmit, such as via a communications interface 16 of the first network node 10, 20) a service request towards the selected second NF node 30. This service request 704 will be referred to herein as the "first service request". In embodiments where the first network node 10, 20 is the first NF node 20, the first NF node 20 may transmit the first service request 704 directly to the selected second NF node 30 or may transmit the first service request 704 indirectly towards the selected second NF node 30 via the first SCP node 10 and/or any other SCP node. The selected second NF node 30 receives the first service request 704 (e.g. via a communications interface of the selected second NF node 30). The first service request 704 is a request for the selected second NF node 30 to execute the service 40.

As illustrated by arrow 706 of FIG. 7, in some embodiments, the selected second NF node 30 may initiate transmission of (e.g. itself transmit or cause another node to transmit, such as via a communications interface of the selected second NF node 30) a first response to the first service request 704 towards the first network node 10, 20. Thus, the first network node 10, 20 receives this first response 706 from the selected second NF node 30. In embodiments where the first network node 10, 20 is the first NF node 20, the first NF node 20 may receive the first response 706 directly from the selected second NF node 30 or may receive the first response 706 indirectly from the selected second NF node 30 via the first SCP node 10 and/or any other SCP node. The first response 706 can comprise load information for the selected second NF node 30. In some embodiments, the first response 706 may comprise a load control information (LCI) header and the LCI header can comprise the load information. The selected second NF node 30 is not configured to require that it receives a predefined amount of network traffic (e.g. for testing, such as canary testing).

In some embodiments, the method that follows may be performed in response to a further event that signals that a service 40 is to be executed (e.g. provided). For example, in some embodiments, as illustrated by arrow 708 of FIG. 7, the first network node 10, 20 may receive an incoming request from another node (which is not illustrated in FIG.

7), e.g. a user equipment (UE), or the first NF node 20 where the first network node is the first SCP node 10, or any other node. Thus, in some embodiments, the event may comprise the first network node 10, 20 receiving an incoming request 708. Although not illustrated in FIG. 7, in other embodiments, the event may comprise an event internal to the first network node 10, 20 that requires that the service 40 is executed.

In the embodiment illustrated in FIG. 7, the incoming request 708 is a service request, which is a request for the service 40 to be executed. As illustrated by block 710 of FIG. 7, in some embodiments, the first network node 10, 20 can select a second NF node 50 in order to proceed network traffic. A person skilled in the art will be aware of various criteria on the basis of which the selection can be performed. However, in the embodiment illustrated in FIG. 7, the first network node 10, 20 already initiated transmission of a first service request 704 towards one of the second NF nodes 30 and thus another second NF node 50 is selected. For example, it may be assumed that the load on this selected second NF node 50 is zero until the first network node 10, 20 receives a response from this selected second NF node 50 that indicates otherwise.

As illustrated by arrow 712 of FIG. 7, in some embodiments, the first network node 10, 20 may initiate transmission of (e.g. itself transmit or cause another node to transmit, such as via a communications interface 16 of the first network node 10, 20) a service request towards the selected second NF node 50. This service request 712 will be referred to herein as the "second service request". In embodiments where the first network node 10, 20 is the first NF node 20, the first NF node 20 may transmit the second service request 712 directly to the selected second NF node 50 or may transmit the second service request 712 indirectly towards the selected second NF node 50 via the first SCP node 10 and/or any other SCP node. The selected second NF node 50 receives the second service request 712 (e.g. via a communications interface of the selected second NF node 50). The second service request 712 is a request for the selected second NF node 50 to execute the service 40.

As illustrated by arrow 714 of FIG. 7, in some embodiments, the selected second NF node 50 may initiate transmission of (e.g. itself transmit or cause another node to transmit, such as via a communications interface of the selected second NF node 50) a second response to the second service request 712 towards the first network node 10, 20. Thus, the first network node 10, 20 receives this second response 714 from the selected second NF node 50. In embodiments where the first network node 10, 20 is the first NF node 20, the first NF node 20 may receive the second response 714 directly from the selected second NF node 50 or may receive the second response 714 indirectly from the selected second NF node 50 via the first SCP node 10 and/or any other SCP node. The second response 714 does not comprise load information for the selected second NF node 50.

If a first configuration criterion of the first NF node 20 and/or a second configuration criterion of at least one of the second NF nodes 30, 50 is met, then the first network node 10, 20 identifies that network traffic for executing the service 40 is to be distributed among the second NF nodes 30, 50 according to a capacity of one or more of the second NF nodes 30, 50. The second configuration criterion of at least one of the second NF nodes 30, 50 can be that mentioned earlier. The first configuration criterion of the first NF node 20 can also be any of those mentioned earlier including that the first NF node 20 is configured to distribute network traffic according to the capacity of the one or more of the second NF nodes 30, 50 in the event that load information is unavailable for at least one of the second NF nodes 30, 50.

In the embodiment illustrated in FIG. 7, this first configuration criterion of the first NF node 20 is met, since load information is not received for the selected second NF node 50. Thus, as illustrated by block 716 of FIG. 7, the first network node 10, 20 identifies that network traffic for executing the service 40 is to be distributed among the second NF nodes 30, 50 according to the capacity of one or more of the second NF nodes 30, 50. For example, the first network node 10, 20 may identify that network traffic for executing the service 40 is to be distributed among the second NF nodes 30, 50 according to the capacity of one or more of the second NF nodes 30, 50, such that the network traffic is load balanced among the second NF nodes 30, 50. Thus, the first network node 10, 20 may identify that it has to perform capacity based load balancing.

In some embodiments, since load information is not received for the selected second NF node 50, the first network node 10, 20 may assign a (e.g. fixed) percentage of the network traffic to the second NF node 50. The percentage can be equal to a percentage capacity of the selected second NF node 50 relative to a total capacity of all second NF nodes 30, 50. In some embodiments, the selected second NF node 50 may be defined by the operator for testing (e.g. canary testing) or may not support load control. As illustrated by block 718 of FIG. 7, in some embodiments, the first network node 10, 20 may calculate this percentage for each second NF node of the one or more of the second NF nodes 30, 50. The total capacity of all second NF nodes 30, 50 used in this calculation can, for example, be calculated in the manner described earlier with reference to FIG. 4.

As illustrated by block 718 of FIG. 7, in some embodiments, the first network node 10, 20 may select a second NF node of the one or more of the second NF nodes 30, 50 towards which subsequent network traffic is (e.g. subsequent incoming requests are) to be transmitted. This selection can be based on the percentage of traffic assigned to each second NF node 30, 50. For example, the first network node 10, 20 may select a second NF node that has not yet received the percentage of network traffic assigned to it. Once a second NF node is selected, the subsequent network traffic can then proceed in the usual way.

Other embodiments include those defined in the following numbered statements:

Embodiment 1. A method for handling execution of a service in a network, wherein the method is performed by a first network node (10, 20), wherein the first network node (10, 20) is a first network function, NF, node (20) of a service consumer or a first service communication proxy, SCP, node (10) that is configured to operate as an SCP between the first NF node (20) and second NF nodes (30, 50) of a service producer for providing the service (40), the method comprising:

in response to an event that signals that the service (40) is to be executed:

if a first configuration criterion of the first NF node (20) and/or a second configuration criterion of at least one of the second NF nodes (30, 50) is met, identifying (102, 506, 608, 716) that network traffic for executing the service (40) is to be distributed among the second NF nodes (30, 50) according to a capacity of one or more of the second NF nodes (30, 50).

Embodiment 2. A method according to Embodiment 1, wherein:

he first configuration criterion of the first NF node (20) is that:

the first NF node (20) is configured to distribute network traffic according to the capacity of the one or more of the second NF nodes (30, 50) irrespective of a load on each of the second NF nodes (30, 50); or the first NF node (20) is configured to distribute network traffic according to the capacity of the one or more of the second NF nodes (30, 50) in the event that load information is unavailable for at least one of the second NF nodes (30, 50); or the first NF node (20) is not configured to support distributing network traffic among the second NF nodes (30, 50) according to the load on the one or more of the second NF nodes (30, 50).

Embodiment 3. A method according to Embodiment 2, wherein:

the first configuration criterion of the first NF node (20) is that:

the first NF node (20) is configured to distribute network traffic according to the capacity of the one or more of the second NF nodes (30, 50) in the event that load information is unavailable for at least one of the second NF nodes (30, 50); and identifying that network traffic for executing the service (40) is to be distributed among the second NF nodes (30, 50) according to the capacity of the one or more of the second NF nodes (30, 50) comprises:

for one or more of the second NF nodes (30, 50) for which load information is unavailable, identifying that network traffic for executing the service (40) is to be distributed among said one or more of the second NF nodes (30, 50) according to the capacity of said one or more of the second NF nodes (30, 50); and/or for one or more of the second NF nodes (30, 50) for which load information is available, identifying that network traffic for executing the service (40) is to be distributed among said one or more of the second NF nodes (30, 50) according to the capacity of said one or more of the second NF nodes (30, 50) and the load on said one or more of the second NF nodes (30, 50).

Embodiment 4. A method according to Embodiment 2, wherein:

the first NF node (20) is configured to distribute network traffic according to the capacity of the one or more of the second NF nodes (30, 50) irrespective of the load on each of the second NF nodes (30, 50) unless the load on at least one of the second NF nodes (30, 50) is a maximum load that the at least one of the second NF nodes (30, 50) is capable of handling.

Embodiment 5. A method according to any of the preceding Embodiments, wherein: the second configuration criterion of at least one of the second NF nodes (30, 50) is that:

the at least one of the second NF nodes (30, 50) is configured to require that it receives a predefined amount of network traffic.

Embodiment 6. A method according to Embodiment 5, wherein:

a profile of the at least one of the second NF nodes (30, 50) comprises information indicative that the at least one of the second NF node (30, 50) is configured to require that it receives the predefined amount of network traffic.

Embodiment 7. A method according to Embodiment 5 or 6, wherein:

the predefined amount of network traffic is a predefined percentage of a total amount of network traffic available for transmission.

Embodiment 8. A method according to any of Embodiments 5 to 7, wherein:

the capacity of the at least one of the second NF nodes (30, 50) is calculated based on a total capacity of all other second NF nodes (30, 50) and the predefined amount of network traffic.

Embodiment 9. A method according to any of the preceding Embodiments, wherein:

a profile of at least one of the second NF nodes (30, 50) comprises information indicative of the capacity of the at least one of the second NF nodes (30, 50).

Embodiment 10. A method according to any of the preceding Embodiments, wherein:

the event that signals that the service (40) is to be executed comprises:

the first network node (10, 20) receiving a service request, wherein the service request is a request for the service (40) to be executed; or an event internal to the first network node (10, 20) that requires that the service (40) is executed.

Embodiment 11. A method according to any of the preceding Embodiments, wherein:

the network traffic for executing the service (40) is to be distributed among the second NF nodes (30, 50) according to the capacity of the one or more of the second NF nodes (30, 50) by:

for each second NF node of the one or more of the second NF nodes (30, 50), assigning a percentage of the network traffic to the second NF node (30, 50), wherein the percentage is equal to a percentage capacity of the second NF node (30, 50) relative to a total capacity of all second NF nodes (30, 50).

Embodiment 12. A method according to any of Embodiments 1 to 10, wherein:

the network traffic for executing the service (40) is to be distributed among the second NF nodes (30, 50) according to the capacity of the one or more of the second NF nodes (30, 50) by:

for each second NF node of the one or more of the second NF nodes (30, 50) that is configured to require that it receives a predefined amount of traffic, assigning the predefined amount of traffic to the second NF node (30, 50); and for all other second NF nodes of the one or more of the second NF nodes (30, 50), assigning a percentage of the remaining network traffic to the second NF node (30, 50), wherein the percentage is equal to a percentage capacity of the second NF node (30, 50) relative to a total capacity of all second NF nodes (30, 50).

Embodiment 13. A method according to any of the preceding Embodiments, the method comprising:

if the first configuration criterion of the first NF node (20) and/or the second configuration criterion of at least one of the second NF nodes (30, 50) is not met, identifying that network traffic for executing the service (40) is to be distributed among the second NF nodes (30, 50) according to a load on one or more of the second NF nodes (30, 50).

Embodiment 14. A method according to any of the preceding Embodiments, wherein:
the first SCP node (10) and the first NF node (20) are deployed in independent deployment units; and/or
the first SCP node (10) and at least one of the second NF nodes (30, 50) are deployed in independent deployment units.

Embodiment 15. A method according to any of Embodiments 1 to 13, wherein:
the first SCP node (10) is deployed as a distributed network element.

Embodiment 16. A method according to Embodiment 15, wherein:
part of the first SCP node (10) is deployed in the same deployment unit as the first NF node (20); and/or
part of the first SCP node (10) is deployed in the same deployment unit as at least one of the second NF nodes (30, 50).

Embodiment 17. A method according to any of the preceding Embodiments, wherein:
at least one second SCP node is configured to operate as an SCP between the first NF node (20) and the first SCP node (10); and/or
at least one third SCP node is configured to operate as an SCP between the first SCP node (10) and at least one of the second NF nodes (30, 50).

Embodiment 18. A method according to Embodiment 17, wherein:
the first SCP node (10) and one or more of the at least one second SCP node and the at least one third SCP node are deployed in independent deployment units.

Embodiment 19. A method according to Embodiment 17, wherein:
the at least one second SCP node and/or the at least one third SCP node are deployed as distributed network elements.

Embodiment 20. A method according to any of the preceding Embodiments, wherein:
an entity comprises the first SCP node (10) and a network repository function, NRF, node (60).

Embodiment 21. A first network node (10, 20) comprising:
processing circuitry (12) configured to operate in accordance with any of Embodiments 1 to 20.

Embodiment 22. A first network node (10) according to Embodiment 21, wherein:
the first network node (10) comprises:
at least one memory (14) for storing instructions which, when executed by the processing circuitry (12), cause the first network node (10) to operate in accordance with any of Embodiments 1 to 20.

Embodiment 23. A computer program comprising instructions which, when executed by processing circuitry, cause the processing circuitry to perform the method according to any of Embodiments 1 to 20.

Embodiment 24. A computer program product, embodied on a non-transitory machine-readable medium, comprising instructions which are executable by processing circuitry to cause the processing circuitry to perform the method according to any of Embodiments 1 to 20.

There is also provided a computer program comprising instructions which, when executed by processing circuitry (such as the processing circuitry 12 of the first network node 10, 20 described earlier), cause the processing circuitry to perform at least part of the method described herein. There is provided a computer program product, embodied on a non-transitory machine-readable medium, comprising instructions which are executable by processing circuitry (such as the processing circuitry 12 of the first network node 10, 20 described earlier) to cause the processing circuitry to perform at least part of the method described herein. There is provided a computer program product comprising a carrier containing instructions for causing processing circuitry (such as the processing circuitry 12 of the first network node 10, 20 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the first network node functionality described herein can be performed by hardware. Thus, in some embodiments, the first network node 10, 20 described herein can be a hardware node. However, it will also be understood that optionally at least part or all of the first network node functionality described herein can be virtualized. For example, the functions performed by the first network node 10, 20 described herein can be implemented in software running on generic hardware that is configured to orchestrate the node functionality. Thus, in some embodiments, the first network node 10, 20 described herein can be a virtual node. In some embodiments, at least part or all of the first network node functionality described herein may be performed in a network enabled cloud. The first network node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically. The method described herein can be a computer-implemented method.

Thus, in the manner described herein, there are advantageously provided improved techniques for handling execution of a service in a network. The techniques can provide a mechanism to support testing (e.g. canary testing) at a second NF node 30, e.g. which may be required by a customer. The techniques are advantageously compatible with existing load control mechanisms. However, when a second NF node 30 is configured to require that it receives a predefined amount of network traffic (e.g. due to it having a testing role), then the first network node 10, 20 is able to identify this and modify its behaviour to distribute network traffic (e.g. to load balance) based on the capacity of one or more second NF nodes 30, 50. Moreover, the techniques allow the second NF node 30 to itself indicate an expected behaviour (e.g. the configuration of the second NF node 30 can dictate the expected behaviour, such as through the inclusion of a flag in its profile) and/or the configuration of the first NF node 20 to dictate the expected behaviour. Advantageously, no specific enhancements are needed to the first network node 10, 20. The techniques can support the coexistence of the first network node 10, 20 with and without support for a load control mechanism, since network traffic can be distributed (e.g. load-balanced) based on a capacity of one or more second NF nodes 30, 50.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a network node for handling execution of a service in a network that includes a first network function (NF) node of a consumer for the service and a plurality of second NF nodes of a producer for the service, the method comprising:

querying respective profiles associated with the plurality of second NF nodes for the following information:

a first indication that a respective second NF node is under testing and a predefined amount of network traffic required by the respective second NF node for the testing;

a network traffic capacity for the respective second NF node; and an amount of network traffic currently handled by the respective second NF node; and distributing network traffic for executing the service among the plurality of second NF nodes based on the queried information included in the respective profiles and further based on traffic distribution criteria, including the following:

distributing, to each second NF node whose profile includes the first indication, the predefined amount of network traffic required by the second NF node for the testing, after which a remaining network traffic to be distributed is determined; and for remaining second NF nodes whose profiles do not include the first indication, the traffic distribution criteria include:

when all profiles for the remaining second NF nodes indicate the amount of network traffic currently handled, distributing the remaining network traffic among the remaining second NF nodes according to respective differences between network traffic capacities for the remaining second NF nodes and amounts of network traffic currently handled by the remaining second NF nodes.

2. The method of claim 1, wherein the traffic distribution criteria also include the following:

when none of the respective profiles include the first indication and at least one of the respective profiles does not indicate the amount of traffic currently handled, distributing the network traffic among the plurality of second NF nodes according to respective network traffic capacities of the plurality of second NF nodes; and when none of the respective profiles include the first indication and all of the respective profiles indicate the amount of network traffic currently handled, distributing the network traffic among the plurality of second NF nodes according to respective differences between network traffic capacities for the plurality of second NF nodes and amounts of network traffic currently handled by the plurality of second NF nodes.

3. The method of claim 1, wherein the traffic distribution criteria also include the following for the remaining second NF nodes whose profiles do not include the first indication:

when one or more profiles associated with the remaining second NF nodes do not indicate the amount of network traffic currently handled, distributing the remaining network traffic among the remaining second NF nodes according to the respective network traffic capacities for the remaining second NF nodes, irrespective of the amounts of network traffic currently handled by the remaining second NF nodes.

4. The method of claim 3, wherein the remaining network traffic is distributed among the remaining second NF nodes irrespective of the amounts of network traffic currently handled by the remaining second NF nodes, except when the amount of network traffic currently handled by at least one of the remaining second NF nodes is at a maximum load capability.

5. The method of claim 1, wherein for at least one second NF node of the plurality of second NF nodes, the predefined amount of network traffic is a predefined percentage of the network traffic for executing the service.

6. The method of claim 1, wherein for at least one second NF node of the plurality of second NF nodes, the network traffic capacity is based on the following:

a total of network traffic capacities for all other second NF nodes of the plurality of second NF nodes, and the predefined amount of network traffic required by the at least one second NF node for testing.

7. The method of claim 1, further comprising identifying that the network traffic for executing the service is to be distributed among the plurality of second NF nodes based on the information queried from the respective profiles and according to traffic distribution criteria, in response to the following:

an event indicating that the service is to be executed, and a traffic distribution configuration of the first NF node.

8. The method of claim 7, wherein the event is one of the following: reception of a service request for the service to be executed, or an event internal to the network node that requires the service to be executed.

9. The method of claim 8, wherein the traffic distribution configuration of the first NF node indicates that the first NF node is configured to distribute network traffic for executing the service according to one of the following:

respective network traffic capacities for the plurality of second NF nodes irrespective of amounts of network traffic currently handled by the plurality of second NF nodes;

the respective network traffic capacities for the plurality of second NF nodes when the amount of network traffic currently handled is unavailable in at least one of the respective profiles; or irrespective of the amount of network traffic currently handled by the plurality of second NF nodes.

10. The method of claim 1, wherein the network node is the first NF node or a first service communication proxy (SCP) node configured to operate as an SCP between the first NF node and the plurality of second NF nodes.

11. A network node configured to handle execution of a service in a network that includes a first network function (NF) node of a consumer for the service and a plurality of second NF nodes of a producer for the service, the network node comprising processing circuitry configured to:

query respective profiles associated with the plurality of second NF nodes for the following information:

a first indication that a respective second NF node is under testing and a predefined amount of network traffic required by the respective second NF node for the testing;

a network traffic capacity for the respective second NF node; and an amount of network traffic currently handled by the respective second NF node; and distribute network traffic for executing the service among the plurality of second NF nodes based on the queried information included in the respective profiles and further based on traffic distribution criteria including the following:

distribute, to each second NF node whose profile includes the first indication, the predefined amount of network traffic required by the second NF node for the testing, after which a remaining network traffic to be distributed is determined; and for remaining second NF nodes whose profiles do not include the first indication, the traffic distribution criteria include:

when all profiles for the remaining second NF nodes indicate the amount of network traffic currently handled, distribute the remaining network traffic among the remaining second NF nodes according to respective differences between network traffic capacities for the remaining second NF nodes and amounts of network traffic currently handled by the remaining second NF nodes.

12. The network node of claim 11, wherein the traffic distribution criteria also include the following:

when none of the respective profiles include the first indication and at least one of the respective profiles does not indicate the amount of traffic currently handled, distribute the network traffic among the plurality of second NF nodes according to respective network traffic capacities of the plurality of second NF nodes; and when none of the respective profiles include the first indication and all of the respective profiles indicate the amount of network traffic currently handled, distribute the network traffic among the plurality of second NF nodes according to respective differences between network traffic capacities for the plurality of second NF nodes and amounts of network traffic currently handled by the one or more plurality of second NF nodes.

13. The network node of claim 11, wherein the traffic distribution criteria also include the following for the remaining second NF nodes whose profiles do not include the first indication:

when one or more profiles associated with the remaining second NF nodes do not indicate the amount of network traffic currently handled, distribute the remaining network traffic among the remaining second NF nodes according to respective network traffic capacities for the remaining second NF nodes, irrespective of the amounts of network traffic currently handled by the remaining second NF nodes.

14. The network node of claim 13, wherein the remaining network traffic is distributed among the remaining second NF nodes irrespective of the amounts of network traffic currently handled by the remaining second NF nodes, except when an amount of network traffic currently handled by at least one of the remaining second NF nodes is at a maximum load capability.

15. The network node of claim 11, wherein for at least one second NF node of the plurality of second NF nodes, the predefined amount of network traffic is a predefined percentage of the network traffic for executing the service.

16. The network node of claim 11, wherein for at least one second NF node of the plurality of second NF nodes, the network traffic capacity is based on the following: a total of network traffic capacities for all other second NF nodes of the plurality of second NF nodes, and the predefined amount of network traffic required by the at least one second NF node for testing.

17. The network node of claim 11, wherein the processing circuitry is further configured to identify that the network traffic for executing the service is to be distributed among the plurality of second NF nodes based on the information queried from the respective profiles and according to traffic distribution criteria, in response to the following:

an event indicating that the service is to be executed, and a traffic distribution configuration of the first NF node.

18. The network node of claim 17, wherein the eventis one of the following: reception of a service request for the service to be executed, or an event internal to the network node that requires the service to be executed.

19. The network node of claim 18, wherein the traffic distribution configuration of the first NF node indicates that the first NF node is configured to distribute network traffic for executing the service according to one of the following:

respective network traffic capacities for the plurality of second NF nodes irrespective of amounts of network traffic currently handled by the plurality of second NF nodes;

the respective network traffic capacities for the plurality of second NF nodes when the amount of network traffic currently handled is unavailable in at least one of the respective profiles; or irrespective of the amount of network traffic currently handled by the one or more plurality of second NF nodes.

20. The network node of claim 11, wherein the network node is the first NF node or a first service communication proxy (SCP) node configured to operate as an SCP between the first NF node and the plurality of second NF nodes.

* * * * *